United States Patent
Muruganathan et al.

(10) Patent No.: US 12,531,622 B2
(45) Date of Patent: Jan. 20, 2026

(54) ENHANCEMENTS FOR BEAM GROUP REPORTING IN MULTI-TRP SCENARIOS

(71) Applicant: Telefonaktiebolaget LM Ericsson (publ), Stockholm (SE)

(72) Inventors: Siva Muruganathan, Stittsville (CA); Andreas Nilsson, Gothenburg (SE); Claes Tidestav, Bålsta (SE); Shiwei Gao, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 323 days.

(21) Appl. No.: 18/260,511

(22) PCT Filed: Jan. 14, 2022

(86) PCT No.: PCT/EP2022/050722
§ 371 (c)(1),
(2) Date: Jul. 6, 2023

(87) PCT Pub. No.: WO2022/152832
PCT Pub. Date: Jul. 21, 2022

(65) Prior Publication Data
US 2024/0056247 A1 Feb. 15, 2024

Related U.S. Application Data

(60) Provisional application No. 63/137,421, filed on Jan. 14, 2021.

(51) Int. Cl.
*H04B 7/06* (2006.01)
*H04B 7/0408* (2017.01)
(Continued)

(52) U.S. Cl.
CPC ....... *H04B 7/06952* (2023.05); *H04B 7/0408* (2013.01); *H04B 7/06966* (2023.05);
(Continued)

(58) Field of Classification Search
CPC .............. H04B 7/06952; H04B 7/0408; H04B 7/06966; H04B 7/088; H04L 5/0035; H04L 5/0051
See application file for complete search history.

(56) References Cited

U.S. PATENT DOCUMENTS

| | | | |
|---|---|---|---|
| 2005/0176468 A1* | 8/2005 | Iacono | H04W 36/083 455/562.1 |
| 2013/0155890 A1* | 6/2013 | Bhattad | H04W 24/02 370/252 |

(Continued)

FOREIGN PATENT DOCUMENTS

| | | |
|---|---|---|
| EP | 3902355 A1 | 10/2021 |
| WO | 2020143647 A1 | 7/2020 |

(Continued)

OTHER PUBLICATIONS

"3GPP TS 38.214 V15.0.0", 3rd Generation Partnership Project; Technical Specification Group Radio Access Network; NR; Physical layer procedures for data (Release 15), Dec. 2017, pp. 1-71.
(Continued)

*Primary Examiner* — Harry H Kim
(74) *Attorney, Agent, or Firm* — Murphy, Bilak & Homiller, PLLC

(57) ABSTRACT

Embodiments include methods for a user equipment (UE) configured for beam reporting in a wireless network. Such methods include receiving a configuration of at least first and second resource sets. Each resource set includes multiple reference signals associated with corresponding multiple spatial filtering configurations. Such methods include performing measurements on the reference signals of the first and second resource sets and sending, to the wireless network, a beam report including the measurements arranged in at least first and second groups. Each group includes measurements performed on a first reference signal
(Continued)

from the first resource set and on a second reference signal from the second resource set. The first and second reference signals are received concurrently by the UE. One measurement included in the first group is expressed as an absolute value, while others in the first group are expressed as differential values relative to the absolute value.

22 Claims, 8 Drawing Sheets

(51) Int. Cl.
  *H04B 7/08* (2006.01)
  *H04L 5/00* (2006.01)
(52) U.S. Cl.
  CPC .......... *H04B 7/088* (2013.01); *H04L 5/0035* (2013.01); *H04L 5/0051* (2013.01)

(56) References Cited

U.S. PATENT DOCUMENTS

| | | | |
|---|---|---|---|
| 2019/0207722 A1* | 7/2019 | Gao | ............ H04W 24/10 |
| 2022/0140878 A1 | 5/2022 | Zhu et al. | |
| 2023/0084460 A1 | 3/2023 | Gao et al. | |
| 2023/0262480 A1* | 8/2023 | Li | ............ H04L 5/0051 |
| | | | 370/329 |

FOREIGN PATENT DOCUMENTS

| | | |
|---|---|---|
| WO | 2020187392 A1 | 9/2020 |
| WO | 2021143652 A1 | 7/2021 |
| WO | 2021161220 A1 | 8/2021 |
| WO | 2022152832 A1 | 7/2022 |

OTHER PUBLICATIONS

"Moderator summary on round 2 discussions", 3GPP TSG RAN WG1 Meeting #103-e, R1-200nnnn, e-Meeting, Oct. 26-Nov. 13, 2020, pp. 1-33.
"3GPP TS 38.212 V16.4.0", 3rd Generation Partnership Project; Technical Specification Group Radio Access Network; NR; Multiplexing and channel coding (Release 16), Dec. 2020, pp. 1-152.
"3GPP TS 38.211 V16.2.0", 3rd Generation Partnership Project; Technical Specification Group Radio Access Network; NR; Physical channels and modulation (Release 16), Jun. 2020, pp. 1-131.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TS 23.501 V16.7.0", 3rd Generation Partnership Project; Technical Specification Group Services and System Aspects; System architecture for the 5G System (5GS); Stage 2 (Release 16), Dec. 2020, pp. 1-450.
"Discussion on beam management for MTRP", 3GPP TSG RAN WG1 #103-e, R1-2009177, e-Meeting, Oct. 16-Nov. 13, 2020, pp. 1-9.
"3GPP TS 38.212 V17.2.0", 3rd Generation Partnership Project; Technical Specification Group Radio Access Network; NR; Multiplexing and channel coding (Release 17), Jun. 2022, pp. 1-201.
"3GPP TS 38.331 V15.17.0", 3rd Generation Partnership Project; Technical Specification Group Radio Access Network; NR; Radio Resource Control (RRC) protocol specification (Release 15), Mar. 2022, pp. 1-543.
"3rd Generation Partnership Project; Technical Specification Group Radio Access Network; NR; Radio Resource Control (RRC) protocol specification (Release 17)", 3GPP TS 38.331 V17.1.0, Jun. 2022, pp. 1-1273.

* cited by examiner

ENHANCEMENTS FOR BEAM GROUP REPORTING IN MULTI-TRP SCENARIOS

TECHNICAL FIELD

The present disclosure relates generally to wireless communication networks, and more specifically to a wireless device reporting measurements made on groups of beams received from (or transmitted by) multiple transmission reception points (TRPs) in a wireless network.

BACKGROUND

LTE is an umbrella term that refers to radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMES 134 and 138 via respective S6a interfaces. In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

The fifth generation (5G) NR technology shares many similarities with fourth-generation LTE. For example, NR uses Orthogonal Frequency Division Multiplexing with a cyclic prefix (CP-OFDM) in the downlink (DL, i.e., network to UE) and both CP-OFDM and DFT-spread OFDM (DFT-S-OFDM) in the (UL, i.e., UE to network). As another example, in the time domain, NR DL and UL physical resources are organized into equal-sized 1-ms subframes. A subframe is further divided into multiple slots of equal duration, with each slot including multiple OFDM-based symbols. NR uses may of the same DL and UL physical channels as LTE. Additionally, the NR RRC layer includes RRC_IDLE and RRC_CONNECTED states, but adds a state called RRC_INACTIVE, which has some properties similar to a "suspended" condition used in LTE.

In addition to providing coverage via "cells," as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), demodulation RS (DMRS), phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

High-gain beamforming is often used at millimeter wave (mmW) frequencies, such that each beam is only optimal within a small area and the performance outside the optimal beam area deteriorates quickly. Hence, frequent and fast beam switching (e.g., within a single TRP or between TRPs) is often needed to maintain satisfactory performance for a UE, particularly at mmW frequencies.

To support such beam switching, a beam indication framework has been specified in NR. For example, PDCCH downlink control information (DCI) contains a transmission configuration indicator (TCI) field that informs a UE which network beam is used for DL data transmission so that the UE can adjust its receive beam accordingly. Prior to data transmission, however, a training phase is used to determine preferred and/or optimal UL and DL beam configurations for UE and network. CSI-RS and SSB are used for DL beam management operations, including UE beam measurement reporting in this training phase.

NR Rel-16 supports multi-source transmission of DL data to UEs. In this context, the term "source" can refer to a beam, a panel, a transmission/reception point (TRP), etc. One type of multi-source transmission is non-coherent joint transmission (NCJT), a type of multiple input multiple output (MIMO) data transmission in which different layers and/or codewords are transmitted by different sources.

SUMMARY

An NCJT enhancement under consideration for NR Rel-17 is group-based beam reporting, whereby a UE can report N>1 beam groups and M>1 beams per group in a single CSI report, including beams within a group that can be received simultaneously by the UE. Even so, it is unclear how a UE can report such information in a way that reduces and/or minimizes signaling overhead between the UE and the network.

Embodiments of the present disclosure provide specific improvements to communication between user equipment (UE) and network nodes in a wireless network, such as by providing, enabling, and/or facilitating solutions to overcome exemplary problems summarized above and described in more detail below.

Embodiments include methods (e.g., procedures) for beam reporting in a wireless network (e.g., E-UTRAN, NG-RAN). These exemplary methods can be performed by a UE (e.g., wireless device, IoT device, etc.).

These exemplary methods can include receiving, from a network node of the wireless network, a configuration of at least first and second resource sets. Each resource set comprises a plurality of reference signals. The reference signals in each resource set are associated with respective spatial filtering configurations. These exemplary methods can also include performing measurements on the reference signals of the at least first and second resource sets. These exemplary methods can also include sending, to the network node, a beam report including the measurements arranged in at least first and second groups.

Each group includes measurements performed on a first reference signal from the first resource set and on a second reference signal from the second resource set. The first and second reference signals are received concurrently by the UE. One of the measurements included in the first group is expressed as an absolute value, while other measurements included in the first group are expressed as differential values relative to the absolute value included in the first group.

In some embodiments, each resource set is associated with one TRP, i.e., the respective resources sets are associated with respective TRPs.

In some embodiments, the measurement in the first group expressed as the absolute value is a measurement of the first reference signal in the first resource set. In some embodiments, other measurements in the first group expressed as the differential values include one or more measurements of the second reference signal in the second resource set. In some embodiments, the measurements included in the second group are expressed as differential values relative to the absolute value included in the first group. In some embodiments, each group includes measurements performed on at most one reference signal from each of the resource sets.

In some embodiments, for each group, the beam report also includes respective reference signal identifiers associated with the first and second reference signals. In some of these embodiments, the beam report is arranged into a plurality of preconfigured bitfields and each group of measurements is arranged according to the following:

a first bitfield that includes the measurement of the first reference signal;
a second bitfield that includes the reference signal identifier associated with the first reference signal;
a third bitfield that includes the measurement of the second reference signal; and
a fourth bitfield that includes the reference signal identifier associated with the second reference signal.

In some embodiments, these exemplary methods can also include receiving, from the network node, a configuration for a number of groups of measurements to be included in a beam report. In such case, the at least first and second groups are included in the beam report in accordance with the configured number. In some of these embodiments, the configuration for the number of groups is included in a setting for CSI reporting.

In some embodiments, each of the reference signals can be one of the following: channel state information reference signal (CSI-RS), or synchronization signal/PBCH block (SSB). In some embodiments, each of the measurements on the reference signals is one of the following: reference signal received power (RSRP), or signal-to-interference-and-noise ratio (SINR).

Other embodiments include methods (e.g., procedures) for beam management in a wireless network. These exemplary methods can be performed by a network node (e.g., base station, eNB, gNB, ng-eNB, etc., or component thereof) in the wireless network (e.g., E-UTRAN, NG-RAN).

These exemplary methods can include sending, to a UE, a configuration of at least first and second resource sets.

Each resource set comprises a plurality of reference signals. The reference signals in each resource set are associated with respective spatial filtering configurations. These exemplary methods can also include transmitting the reference signals comprising the at least first and second resource sets. These exemplary methods can also include receiving, from the UE, a beam report including measurements arranged in at least first and second groups.

Each group includes measurements performed by the UE on a first reference signal from the first resource set and on a second reference signal from the second resource set. The first and second reference signals are transmitted concurrently. One of the measurements included in the first group is expressed as an absolute value, while other measurements included in the first group are expressed as differential values relative to the absolute value included in the first group.

In some embodiments, each resource set is associated with one TRP, i.e., the respective resources sets are associated with respective TRPs. Put differently, the network node can transmit the reference signals comprising the respective resources sets via respective TRPs.

In some embodiments, the measurement in the first group expressed as the absolute value is a measurement of the first reference signal in the first resource set. In some embodiments, other measurements in the first group expressed as the differential values include one or more measurements of the second reference signal in the second resource set. In some embodiments, the measurements included in the second group are expressed as differential values relative to the absolute value included in the first group. In some embodiments, each group includes measurements performed on at most one reference signal from each of the resource sets.

In some embodiments, for each group, the beam report also includes respective reference signal identifiers associated with the first and second reference signals. In some of these embodiments, the beam report is arranged into a plurality of preconfigured bitfields and each group of measurements can be arranged in the same or a similar manner as summarized above for UE embodiments.

In some embodiments, these exemplary methods can also include sending, to the UE, a configuration for a number of groups of measurements to be included in a beam report. In such case, the at least first and second groups are included in the beam report in accordance with the configured number. In some of these embodiments, the configuration for the number of groups is included in a setting for CSI reporting.

In some embodiments, each of the reference signals can be one of the following: CSI-RS, or SSB. In some embodiments, each of the measurements on the reference signals is one of the following: RSRP, or SINR.

Other embodiments include UEs (e.g., wireless devices, IoT devices, etc. or components thereof) and network nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other embodiments described herein provide flexible and efficient techniques that enable and/or facilitate efficient signaling of group-based beam reporting for multi-TRP (mTRP) scenarios. Such techniques can reduce signaling overhead for individual CSI reports, thereby facilitating faster CSI reporting by individual UEs and/or capacity for more CSI reports, thereby improving beam management operations in a wireless network.

These and other objects, features, and advantages of embodiments of the present disclosure will become apparent upon reading the following Detailed Description in view of the Drawings briefly described below.

BRIEF DESCRIPTION OF THE DRAWINGS

FIG. 9, which includes

DETAILED DESCRIPTION

Figure 1:
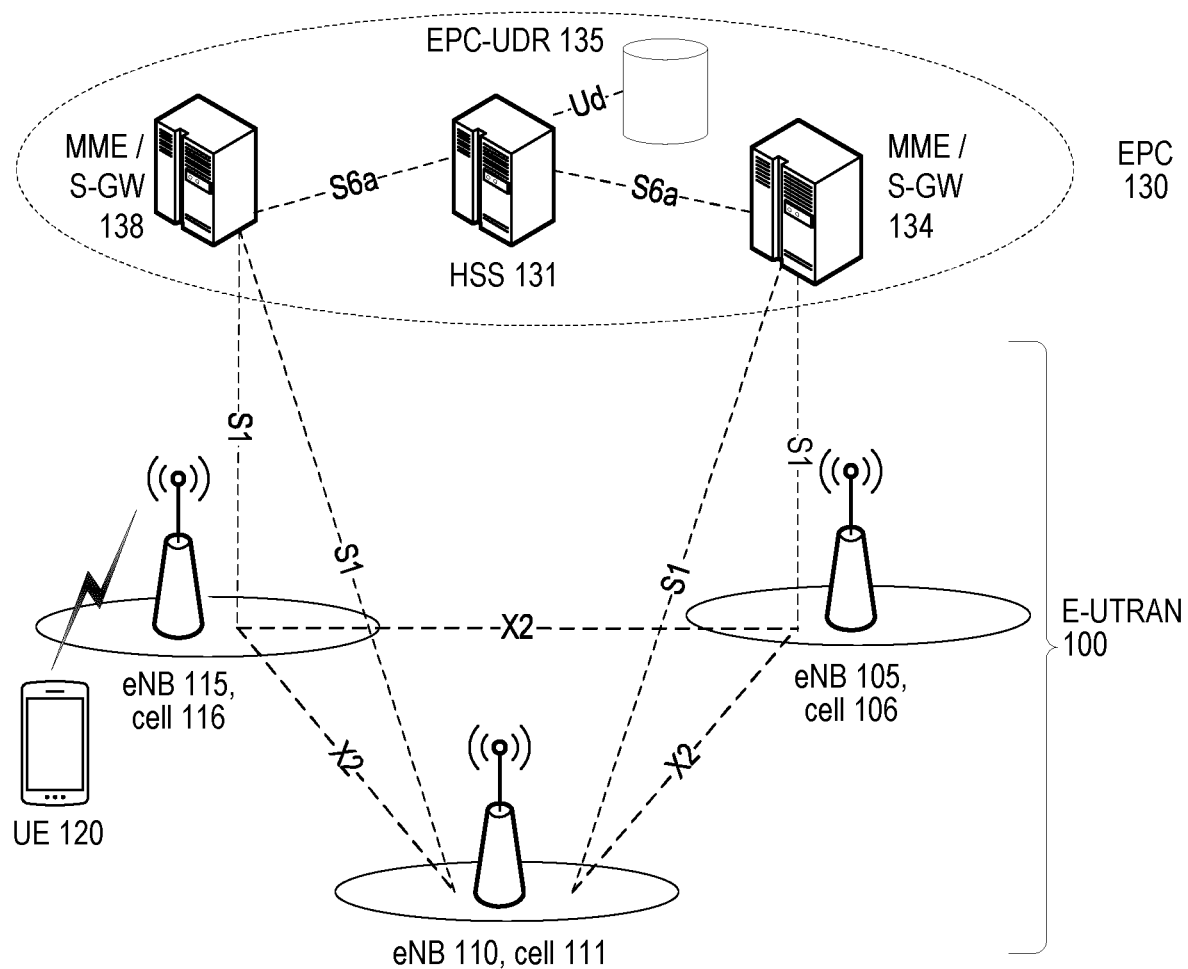
FIG. 1 is a high-level block diagram of an exemplary LTE network architecture.
Figure 2:
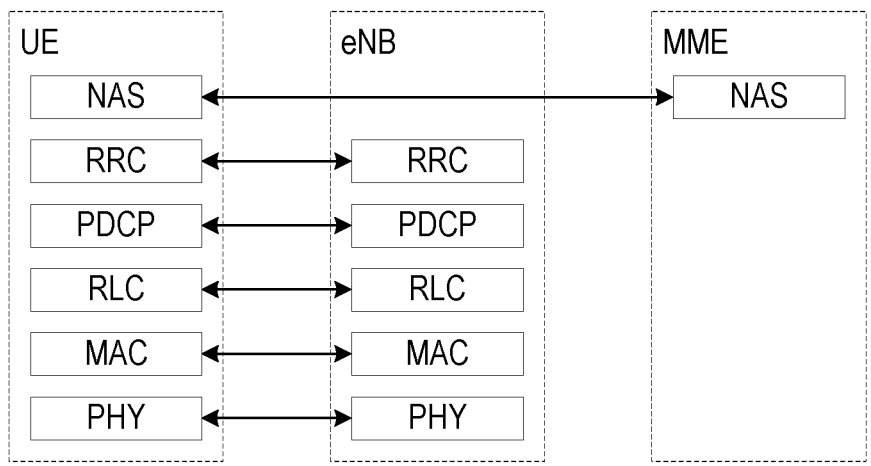
FIG. 2 is a block diagram of an exemplary LTE control plane (CP) protocol stack.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, in NR, cell reselection measurements involve the UE calculating parameters SS-RSRP and SS-RSRQ for the serving cell as well as neighbor cells. These parameters are typically calculated based on UE measurements of SSBs transmitted with a configured periodicity, e.g., 20 ms. Currently, the UE must rely on SSB for cell reselection because no other DL RS are guaranteed for UEs in non-connected states (e.g., RRC_IDLE and RRC_INACTIVE). This uncertainty can cause undesirable UE behavior, particularly in relation to energy consumption. This is discussed in more detail below, after the following description of NR network architectures and radio interface.

Figure 3:
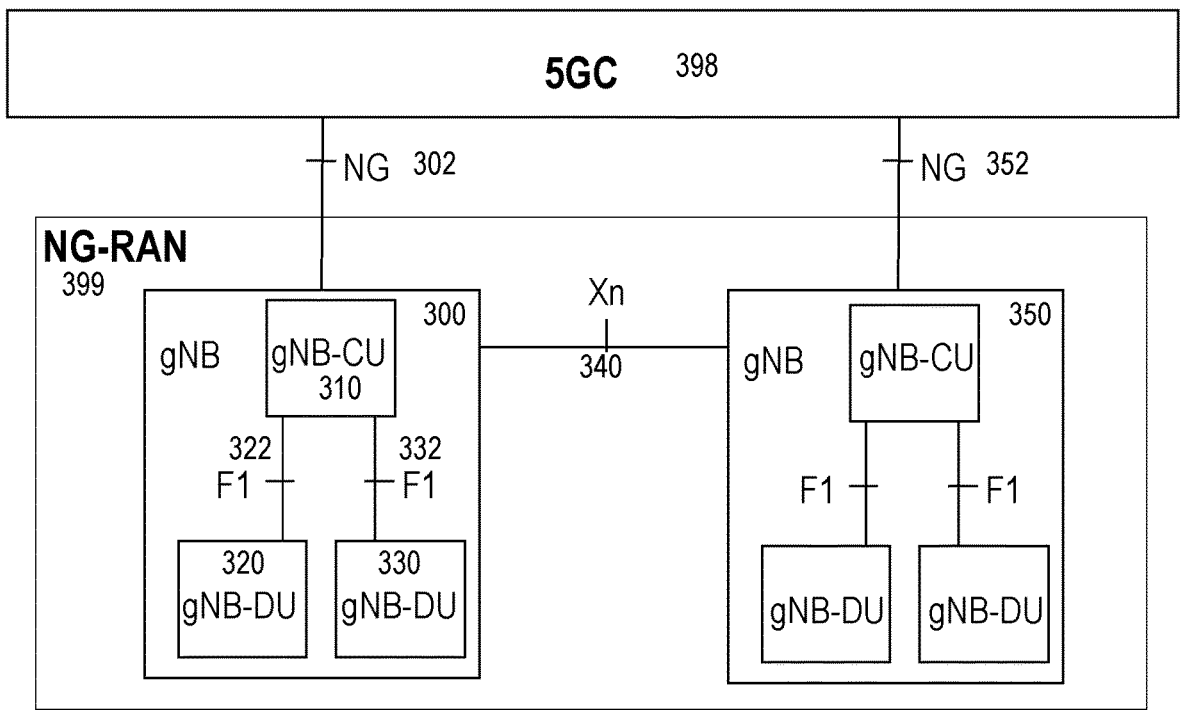
FIGS. 3-4 show two high-level views of an exemplary 5G/NR network architecture.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 5GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," with the term AMF being described in more detail below.

The NG RAN logical nodes shown in FIG. 3 include a central (or centralized) unit (CU or gNB-CU) and one or more distributed (or decentralized) units (DU or gNB-DU). For example, gNB 300 includes gNB-CU 310 and gNB-DUs 320 and 340. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU.

Figure 4:
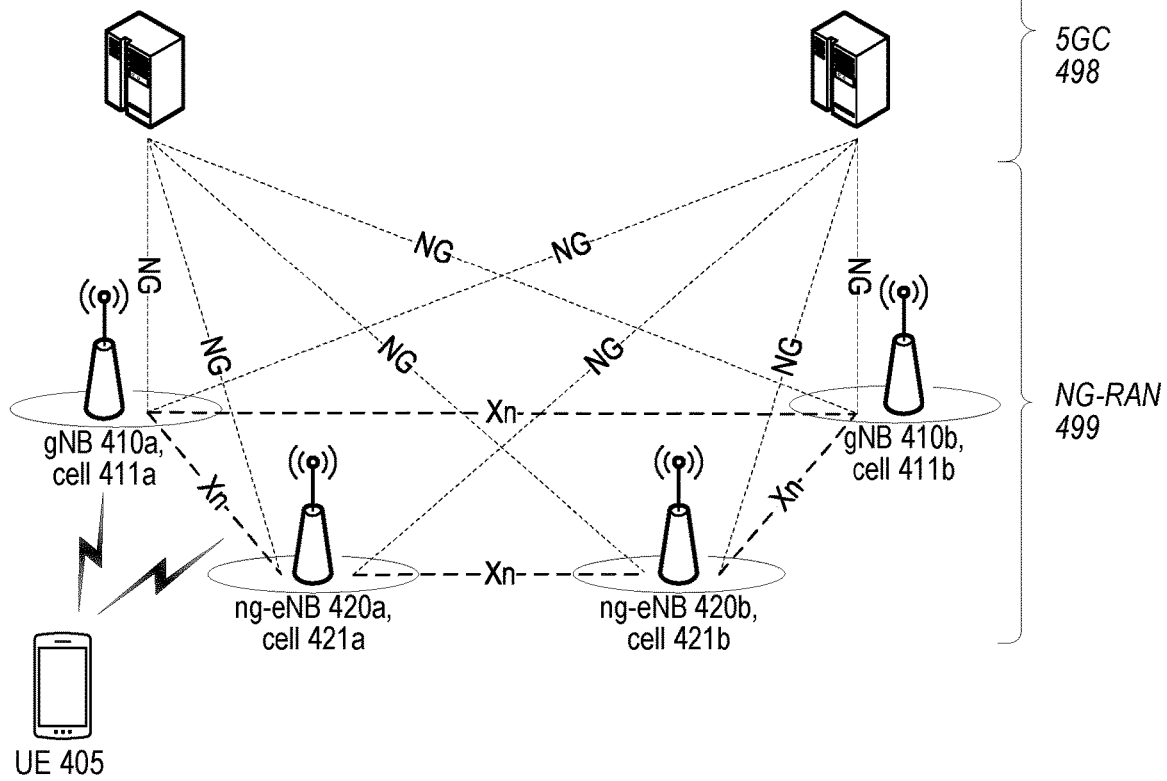

FIG. 4 shows a high-level view of another exemplary 5G network architecture, including an NG-RAN 499 and a 5GC 498. As shown in the figure, NG-RAN 499 can include gNBs (e.g., 410a,b) and ng-eNBs (e.g., 420a,b) that are interconnected with each other via respective Xn interfaces. The gNBs and ng-eNBs are also connected via the NG interfaces to 5GC 498, more specifically to the Access and Mobility Management Functions (AMF, e.g., 430a,b) via respective NG-C interfaces and to the User Plane Function (UPF, e.g., 440a,b) via respective NG-U interfaces. Moreover, the AMFs can communicate with one or more Policy Control Functions (PCFs, e.g., 450a,b) and Network Exposure Functions (NEFs, e.g., 460a,b).

Each of the gNBs can support the NR radio interface including frequency division duplexing (FDD), time division duplexing (TDD), or a combination thereof. In contrast, each of ng-eNBs 420 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 411a-b and 421a-b shown as exemplary in FIG. 4. As mentioned above, the gNBs and ng-eNBs can also use various directional beams to provide coverage in the respective cells. Depending on the particular cell in which it is located, a UE 405 can communicate with the gNB or ng-eNB serving that particular cell via the NR or LTE radio interface, respectively.

Each of the gNBs 410 may include and/or be associated with a plurality of Transmission Reception Points (TRPs). Each TRP is typically an antenna array with one or more antenna elements and is located at a specific geographical location. In this manner, a gNB associated with multiple TRPs can transmit the same or different signals from each of the TRPs. For example, a gNB can transmit different version of the same signal on multiple TRPs to a single UE. Each of the TRPs can also employ beams for transmission and reception towards the UEs served by the gNB, as discussed above.

In multi-TRP operation, a UE receives from (or transmit to) multiple TRPs in the NG-RAN. Until NR Rel-16, these multiple transmissions were on a single carrier and associated with a single cell, as compared to carrier aggregation that uses multiple carriers/cells. An important benefit of multi-TRP operation is reliability due to the spatial diversity provided by the different transmission paths to/from the respective TRPs. A basic operational principle of spatial diversity is that multiple copies of the same data payload are combined at the receiver to improve the receiver's capability to recover the data payload. More specifically, multi-TRP diversity helps reduce both blocking by obstacles (macro diversity) and fast fading due to combinations of signal reflections at the receiver.

Figure 5:
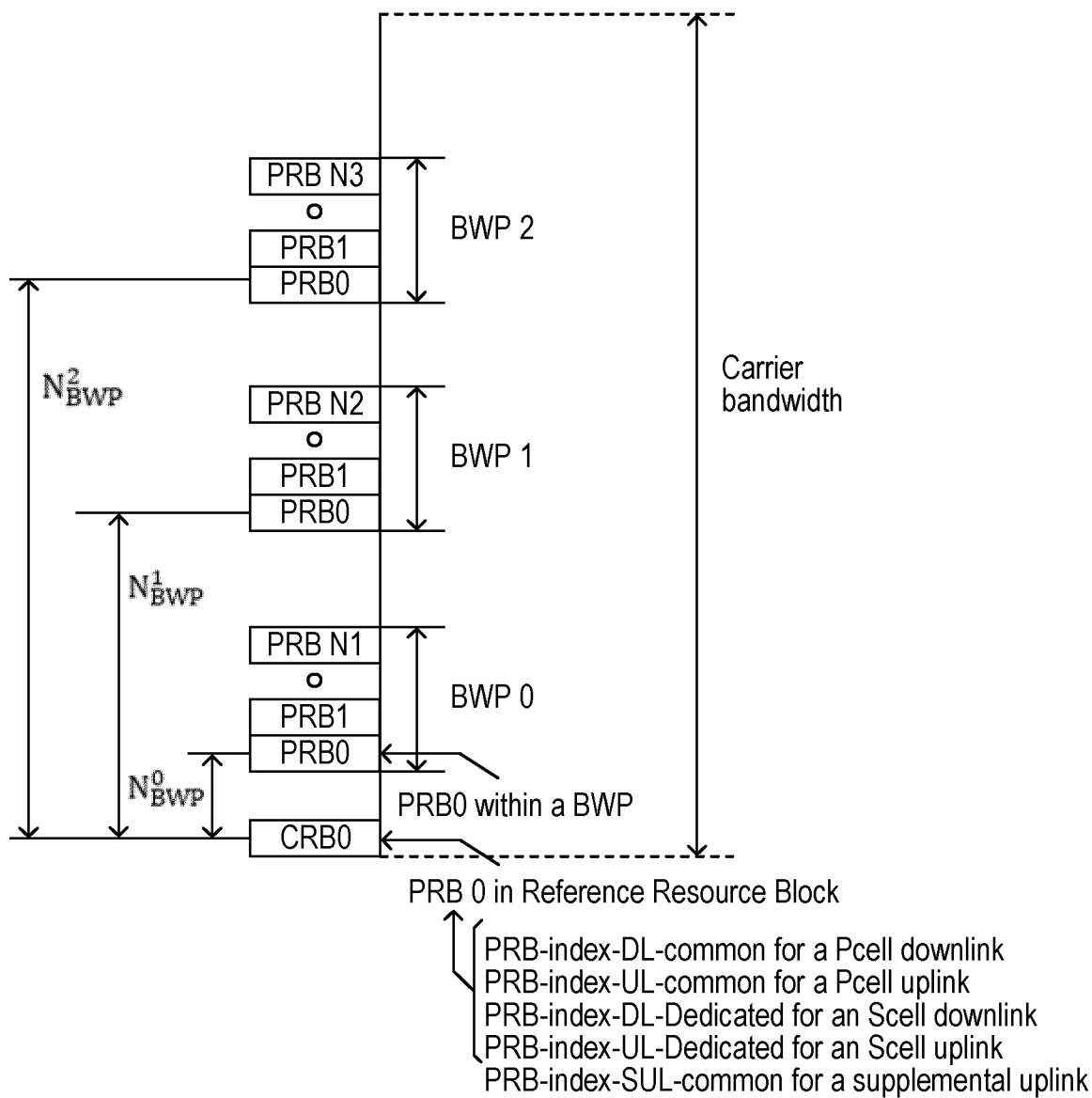
FIG. 5 shows an exemplary frequency-domain configuration for a 5G/NR UE.

FIG. 5 shows an exemplary frequency-domain configuration for an NR UE. In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time. In the exemplary arrangement of FIG. 5, the UE is configured with three DL (or UL) BWPs, labelled BWP 0-2, respectively.

Common RBs (CRBs) are numbered from 0 to the end of the carrier bandwidth. Each BWP configured for a UE has a common reference of CRB0 (as shown in FIG. 5), such that a configured BWP may start at a CRB greater than zero. CRB0 can be identified by one of the following parameters provided by the network, as further defined in 3GPP TS 38.211 section 4.4:

PRB-index-DL-common for DL in a primary cell (PCell, e.g., PCell or PSCell);
PRB-index-UL-common for UL in a PCell;
PRB-index-DL-Dedicated for DL in a secondary cell (SCell);
PRB-index-UL-Dedicated for UL in an SCell; and
PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. In the arrangement shown in FIG. 5, BWPs 0-2 start at CRBs $N^0_{BWP}$, $N^1_{BWP}$, and $N^2_{BWP}$, respectively. Within a BWP, PRBs are defined and numbered in the frequency domain from 0 to $N_{BWPi}^{size}-1$, where i is the index of the particular BWP for the carrier. In the arrangement shown in FIG. 5, BWPs 0-2 include PRBs 0 to N1, N2, and N3, respectively.

Each NR resource element (RE) corresponds to one OFDM subcarrier during one OFDM symbol interval. NR supports various SCS values $\Delta f = (15 \times 2^\mu)$ kHz, where $\mu \in (0, 1, 2, 3, 4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^\mu * 50$ MHz. Table 1 below summarizes the supported NR numerologies and associated parameters. Different DL and UL numerologies can be configured by the network.

TABLE 1

| $\mu$ | $\Delta f = 2^\mu \cdot$ 15 (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 µs | 66.67 µs | 71.35 µs | 1 ms | 50 MHZ |
| 1 | 30 | Normal | 2.34 µs | 33.33 µs | 35.68 µs | 0.5 ms | 100 MHz |
| 2 | 60 | Normal, Extended | 1.17 µs | 16.67 µs | 17.84 µs | 0.25 ms | 200 MHZ |
| 3 | 120 | Normal | 0.59 µs | 8.33 µs | 8.92 µs | 125 µs | 400 MHZ |
| 4 | 240 | Normal | 0.29 µs | 4.17 µs | 4.46 µs | 62.5 µs | 800 MHZ |

Figure 6:
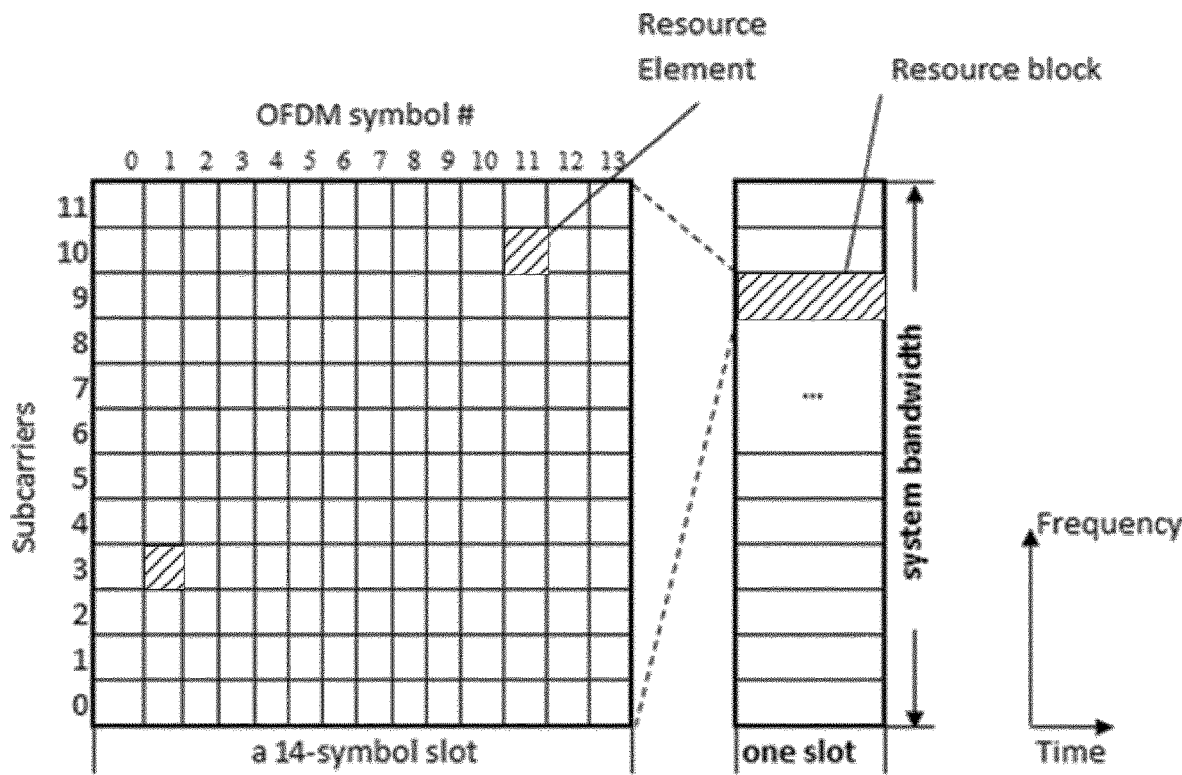
FIG. 6 shows an exemplary time-frequency resource grid for an NR (e.g., 5G) slot.

FIG. 6 shows an exemplary time-frequency resource grid for an NR slot. As illustrated in FIG. 6, a resource block (RB) consists of a group of 12 contiguous OFDM subcarriers for a duration of a 14-symbol slot. Like in LTE, a resource element (RE) consists of one subcarrier in one slot.

An NR slot can include 14 OFDM symbols for normal cyclic prefix and 12 symbols for extended cyclic prefix.

In general, an NR physical channel corresponds to a set of REs carrying information that originates from higher layers. Downlink (DL, i.e., gNB to UE) physical channels include Physical Downlink Shared Channel (PDSCH), Physical Downlink Control Channel (PDCCH), and Physical Broadcast Channel (PBCH).

PDSCH is the main physical channel used for unicast DL data transmission, but also for transmission of RAR (random access response), certain system information blocks (SIBs), and paging information. PBCH carries the basic system information (SI) required by the UE to access a cell. PDCCH is used for transmitting DL control information (DCI) including scheduling information for DL messages on PDSCH, grants for UL transmission on PUSCH, and channel quality feedback (e.g., CSI) for the UL channel.

Uplink (UL, i.e., UE to gNB) physical channels include Physical Uplink Shared Channel (PUSCH), Physical Uplink Control Channel (PUCCH), and Physical Random-Access Channel (PRACH). PUSCH is the uplink counterpart to the PDSCH. PUCCH is used by UEs to transmit uplink control information (UCI) including HARQ feedback for gNB DL transmissions, channel quality feedback (e.g., CSI) for the DL channel, scheduling requests (SRs), etc. PRACH is used for random access preamble transmission.

Within the NR DL, certain REs within each subframe are reserved for the transmission of reference signals (RS). These include demodulation reference signals (DM-RS), which are transmitted to aid the UE in the reception of an associated PDCCH or PDSCH. Other DL reference signals include positioning reference signals (PRS) and CSI reference signals (CSI-RS), which are monitored by the UE for the purpose of providing channel quality feedback (e.g., CSI) for the DL channel. Phase-tracking RS (PTRS) are used by the UE to identify common phase error (CPE) present in sub-carriers of a received DL OFDM symbol. Other RS-like DL signals include Primary Synchronization Sequence (PSS) and Secondary Synchronization Sequence (SSS), which facilitate the UEs time and frequency synchronization and acquisition of system parameters (e.g., via PBCH). The PSS, SSS, and PBCH are collectively referred to as an SS/PBCH block (SSB).

Figure 7:
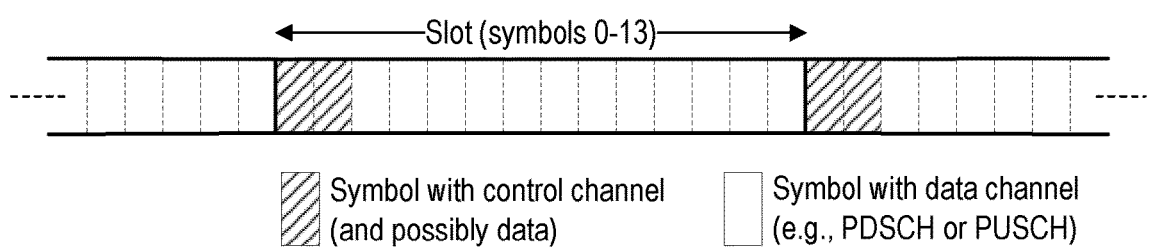
FIG. 7 shows an exemplary NR slot configuration.

FIG. 7 shows another exemplary NR slot structure comprising 14 symbols. In this arrangement, PDCCH is confined to a region containing a particular number of symbols and a particular number of subcarriers, referred to as the control resource set (CORESET). In general, a CORESET includes multiple RBs (i.e., multiples of 12 REs) in the frequency domain and 1-3 OFDM symbols in the time domain. In the exemplary structure shown in FIG. 7, the first two symbols contain PDCCH and each of the remaining 12 symbols contains physical data channels (PDCH), i.e., either PDSCH or PUSCH. Depending on the particular CORESET configuration (discussed below), however, the first two slots can also carry PDSCH or other information, as required.

The smallest unit for defining CORESET is resource element group (REG), which spans one PRB in frequency and one OFDM symbol in time. CORESET resources can be indicated to a UE by RRC signaling.

In addition to PDCCH, each REG in a CORESET contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in a REG bundle.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

In NR Rel-15, the DCI formats 0_0/1_0 are referred to as "fallback DCI formats," while the DCI formats 0_1/1_1 are referred to as "non-fallback DCI formats." The fallback DCI support resource allocation type 1 in which DCI size depends on the size of active BWP. As such, DCI formats 0_1/1_1 are intended for scheduling a single transport block (TB) transmission with limited flexibility. On the other hand, the non-fallback DCI formats can provide flexible TB scheduling with multi-layer transmission.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

A hashing function can be used to determine the CCEs corresponding to PDCCH candidates that a UE must monitor within a search space set. The hashing is done differently for different UEs. In this manner, CCEs used by the UEs are randomized and the probability of collisions between multiple UEs having messages included in a CORESET is reduced. Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (u) and the total number of allocated PRBs before rate matching ($n_{PRB}$), the UE determines the Transport Block Size (TB S) for the PDSCH according to the procedure defined in 3GPP TS 38.214 V15.0.0 clause 5.1.3.2.

High-gain beamforming is often used at millimeter wave (mmW) frequencies, such that each beam is only optimal within a small area and the performance outside the optimal beam area deteriorates quickly. Hence, frequent and fast beam switching (e.g., within a single TRP or between TRPs) is often needed to maintain satisfactory performance for a UE, particularly at mmW frequencies.

Beam management has been defined for NR since Rel-15. The feature is used to keep track of suitable beams for transmission and reception. Network nodes that use analog beamforming with fixed grid-of-beam transmission schemes typically monitor beam candidates continuously, e.g., by evaluating UE reports of layer-1 (L1) reference signal received power (RSRP) per beam. UEs perform such measurements on SSBs associated with the respective beams.

In general, the NR beam management framework allows the network to inform the UE about spatial relations between beams and to facilitate UE-side beam tracking. Before starting a random access channel (RACH) procedure towards the network, the UE measures on a set of SSBs and chooses a suitable one. The UE then transmits on the RACH resources associated with the selected SSB. The corresponding beam will be used by both the UE and the network to communicate until RRC_CONNECTED state beam management is active. The network infers which SSB beam was chosen by the UE without any explicit signaling. This procedure for finding an initial beam is often denoted P1.

The network can use the SSB beam as an indication of which (narrow) CSI-RS beams to try, i.e., the candidate set of narrow CSI-RS beams for beam management is based on the best SSB beam. Once CSI-RS is transmitted, the UE measures RSRP and reports the result to the network. If the network receives a CSI-RSRP report from the UE that indicates a new CSI-RS beam is better than the beam used to transmit PDCCH/PDSCH, the network updates the serving beam for the UE accordingly (and possibly also modifies the candidate set of CSI-RS beams).

The network can also instruct the UE to perform measurements on SSBs. If the network receives a UE report indicating that a new SSB beam is better than the previous best SSB beam, a corresponding update of the candidate set of CSI-RS beams for the UE may be motivated. This refinement procedure is often referred to as P2.

Once in RRC_CONNECTED state, the UE is configured with a set of reference signals. Based on beam management/L1 measurements, the UE determines which of its DL beams is suitable to receive each reference signal in the set. The network then indicates which reference signals are associated with the beam that will be used to transmit PDCCH/PDSCH, and the UE uses this information to adjust its DL beam when receiving PDCCH/PDSCH. PDCCH and PDSCH beams can be identical—if not, additional signaling is needed.

For example, PDCCH DCI contains a transmission configuration indicator (TCI) field that informs a UE which network beam is used for data transmission on PDSCH, so that the UE can adjust its receive (Rx) beam accordingly. This can be particularly beneficial for analog Rx beamforming, where the UE needs to determine and apply Rx beamforming weights before it can receive the PDSCH.

In the following, the terms "beamforming weights", "spatial filtering weights", and "spatial filtering configuration" refer to the complex-valued weights that are applied to antenna signals at either the transmitter (network node or UE) and the receiver (UE or network node) to facilitate data/control transmission and/or reception. Different propagation environments may produce different spatial filtering weights that match the transmission/reception of a signal to a propagation channel. The spatial filtering weights may not always result in a beam in a strict sense.

When the network has updated its serving DL transmit beam for the UE, the UE may need to update its corresponding DL receive beam. To accomplish this, the network repeatedly transmits CSI-RS on the new serving transmit beam while the UE varies its receive beam. The UE can then select the best receive beam and associate it with the measured reference signal. This procedure is often referred to as P3.

Several signals can be transmitted from the same base station (e.g., gNB) antenna from different antenna ports. These signals can have the same large-scale properties, such as in terms of parameters including Doppler shift/spread, average delay spread, and/or average delay. These antenna ports are then said to be "quasi co-located" or "QCL". The network can signal to the UE that two antenna ports are QCL with respect to one or more parameters. Once the UE knows that two antenna ports are QCL with respect to a certain parameter (e.g., Doppler spread), the UE can estimate that parameter based on one of the antenna ports and use that estimate when receiving the other antenna port. Typically, the first antenna port is represented by a measurement reference signal such as CSI-RS (referred to as "source RS") and the second antenna port is a demodulation reference signal (DMRS) (referred to as "target RS").

For instance, if antenna ports A and B are QCL with respect to average delay, the UE can estimate the average delay from the signal received from antenna port A (source RS) and assume that the signal received from antenna port B (target RS) has the same average delay. This can be useful for demodulation since the UE can know beforehand the properties of the channel when trying to measure the channel utilizing the DMRS.

Information about what assumptions can be made regarding QCL is signaled to the UE from the network. In NR, the following four types of QCL relations between a transmitted source RS and transmitted target RS are defined:

Type A: {Doppler shift, Doppler spread, average delay, delay spread}
Type B: {Doppler shift, Doppler spread}
Type C: {average delay, Doppler shift}
Type D: {Spatial Rx parameter}

QCL type D was introduced to facilitate beam management with analog beamforming and is known as "spatial QCL." There is currently no strict definition of spatial QCL, but the understanding is that if two transmitted antenna ports are spatially QCL, the UE can use the same Rx beam to receive them. When a QCL relation is signaled to a UE, it includes not only information about the particular QCL type (e.g., A, B, C, or D), but also a serving cell index, a BWP index, and a source reference signal identity (CSI-RS, TRS or SSB).

QCL Type D is the most relevant for beam management, but it is also necessary to convey a Type A QCL RS relation to UEs so they can estimate all the relevant large scale parameters. Typically, this can be done by configuring a UE with a tracking reference signal (TRS, e.g., a CSI-RS) for time/frequency offset estimation. To be able to use any QCL reference, the UE would have to receive it with a sufficiently good signal-to-interference-plus-noise ratio (SINR). In many cases, this constrains the TRS for a particular UE to be transmitted in a particular beam and/or beam configuration.

In other words, one could say that two signals are transmitted in the same direction or via the same downlink beams when these are QCL Type D. If the UE knows that a signal is spatially QCL with some other signal it received earlier with a particular RX beam, then the UE can reliably use the same RX beam to receive this signal. Hence, the network may give this relation between a channel to be decoded (e.g., PDCCH/PDSCH) and a signal that is known to be transmitted in a given direction that may be used as reference by the UE, like CSI-RS, SSB, etc.

To introduce dynamics in beam and TRP selection, the UE can be configured through RRC signaling with N Transmission Configuration Indicator (TCI) states, where N is up to 128 in frequency range 2 (FR2, e.g., above 6 GHz) and up to eight in FR1 (e.g., below 6 GHz), depending on UE capability. Each configured TCI state includes parameters for the QCL associations between source RS (e.g., CSI-RS or SS/PBCH) and target RS (e.g., PDSCH/PDCCH DMRS antenna ports). TCI states can also be used to convey QCL information for the reception of CSI-RS. The N states in the list of TCI states can be interpreted as N possible beams transmitted by the network, N possible TRPs used by the network to communicate with the UE, or a combination of one or multiple beams transmitted from one or multiple TRPs.

As a more concrete example, PDSCH may be transmitted to a UE from multiple TRPs. Since different TRPs may be located in different physical locations and have different beams, the propagation channels can be different. To facilitate receiving PDSCH data from different TRPs or beams, a UE may be configured by RRC with multiple TCI states. Each TCI state contains QCL information between the DMRS for PDSCH and one or two DL reference signals such as NZP CSI-RS or SSB. Different NZP CSI-RS or SSB may be associated with different TRPs or beams. The QCL information can be used by a UE to apply large scale channel properties associated with the DL reference signals (e.g., NZP CSI-RS or SSB) to DMRS of PDSCH for channel estimation and PDSCH reception.

More specifically, each TCI state can contain an ID along with QCL information for one or two source DL RSs, with each source RS associated with a QCL type, a serving cell index, a BWP index, and a source reference signal identity (CSI-RS, TRS or SSB). For example, two different CSI-RSs {CSI-RS1, CSI-RS2} can be configured in the TCI state as {qcl-Type1, qcl-Type2}={Type A, Type D}. The UE can interpret this TCI state to mean that the UE can derive Doppler shift, Doppler spread, average delay, delay spread from CSI-RS1, and Spatial Rx parameter (e.g., RX beam to use) from CSI-RS2. In case QCL Type D is not applicable (e.g., low- or mid-band operation), then a TCI state contains only a single source RS. Unless specifically noted, however, references to source RS "pairs" include cases of a single source RS.

Furthermore, a first list of available TCI states can be configured for PDSCH, and a second list can be configured for PDCCH. This second list can contain pointers, known as TCI State IDs, to a subset of the TCI states configured for PDSCH. For the UE operating in FR1, the network then activates one TCI state for PDCCH (i.e., by providing a TCI to the UE) and up to eight TCI states for PDSCH, depending on UE capability.

As an example, a UE can be configured with four active TCI states from a list of 64 total configured TCI states. A subset of the RRC-configured TCI states may be activated by MAC CE for PDSCH. The UE need not be prepared to estimate large scale parameters for the configured but non-active TCI states. On the other hand, the UE continuously tracks and updates large-scale parameters for the active TCI states by performing measurements and analysis of the source RSs indicated for each of those active TCI states.

One or two of the activated TCI states may be dynamically selected and indicated in a DCI scheduling a PDSCH depending on which TRP(s) or beam(s) carry the PDSCH. Each codepoint of the TCI field in DCI provides a pointer (or index) to one or two active TCI states for the scheduled UE. A TCI field codepoint indicating one TCI state can be used to transmit PDSCH from a single TRP or single beam. If a TCI field codepoint indicates two TCI states, then PDSCH can be transmitted from two TRPs or two beams. Based on the particular codepoint, the UE knows which large scale parameter estimate to use when performing PDSCH DMRS channel estimation and PDSCH demodulation.

Figure 8:
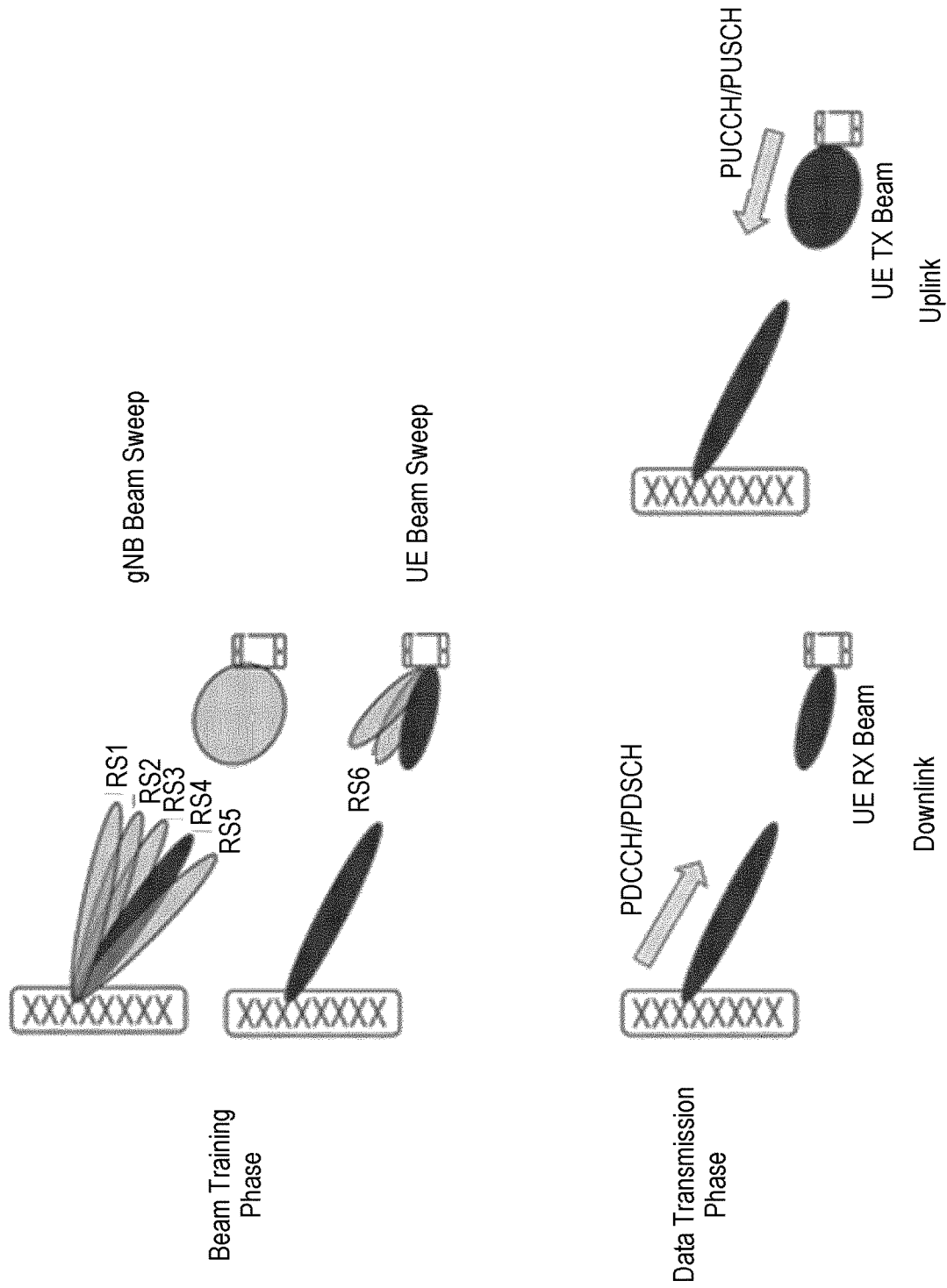
FIG. 8 shows exemplary beam training and data transmission phases.

The beam management procedures discussed above include a beam training phase used to determine preferred and/or optimal UL and DL beam configurations for UE and network, prior to a data transmission. FIG. 8 shows an exemplary beam training phase followed by an exemplary data transmission phase. In this example, CSI-RS is used to find an appropriate beam pair link (BPL), including a suitable network transmit spatial filtering configuration (e.g., gNB Tx beam) and a suitable UE receive spatial filtering configuration (e.g., UE Rx beam) that will produce a satisfactory link budget.

In the example shown in FIG. 8, in the gNB Tx beam sweep, the gNB configures the UE to measure on a set of five (5) CSI-RS resources (RS1-RS5) that are transmitted with five different spatial filtering configurations (e.g., gNB Tx beams). The UE is also configured to report back the RS ID and the maximum measured RSRP and the RS ID of the CSI-RS on which it was measured. In this example, the maximum measured RSRP corresponds to RS4. In this way the gNB learns the preferred Tx beam from the UE perspective.

In the subsequent UE Rx beam sweep, the gNB transmits a number of CSI-RS resources in different OFDM symbols using the same spatial filtering configuration (e.g., gNB Tx beam) used to transmit RS4 previously. The UE attempts to maximize the measured RSRP by applying a different Rx spatial filtering configuration (e.g., UE Rx beam) in each OFDM symbol. The UE remembers the RS ID (RS ID 6 in this example) and the corresponding spatial filtering configuration that resulted in the maximum measured RSRP. The network can then refer to this RS ID in the future when DL data is scheduled to the UE, thus allowing the UE to adjust its Rx spatial filtering configuration (Rx beam) to receive the PDSCH. As mentioned above, the RS ID is contained in a TCI that is carried in a field in the DCI that schedules PDSCH.

As briefly mentioned above, NR Rel-16 supports multi-source transmission of PDSCH to UEs (also referred to as NC-JT) in which MIMO layers carrying mapped codewords (CWs) can be transmitted over multiple TRPs in various ways. For example, when the UE has four receive antennas while each of the TRPs has only two transmit antennas, the UE can support up to four MIMO layers. In this case, by transmitting data over two TRPs to the UE, the peak data rate to the UE can be increased as up to four aggregated layers from the two TRPs can be used. This is beneficial when the traffic load and/or resource utilization is low in each TRP, since resources in two TRPs can be used for scheduling one UE.

Figure 9A:
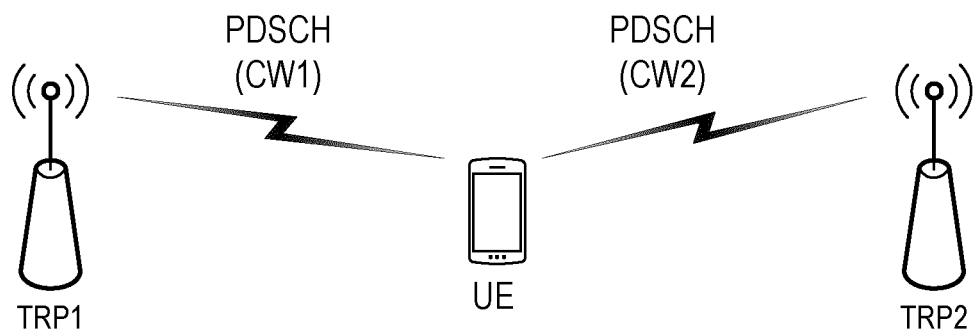
FIGS. 9A-B, shows two examples of non-coherent joint transmission (NCJT) involving two transmission reception points (TRPs) and one UE.

FIG. 9A shows an exemplary NCJT configuration in which a PDSCH is sent to a UE from two TRPs, each carrying a different CW. For example, when the UE has four receive antennas while each of the TRPs has only two transmit antennas, the UE can support up to four MIMO layers. In this case, by transmitting data over two TRPs to the UE, the peak data rate to the UE can be increased since up to four aggregated layers from the two TRPs can be used. This is beneficial when the traffic load and/or resource utilization is low in each TRP, thereby facilitating scheduling resources in two TRPs for one UE. This technique can also be beneficial in the case where the UE is in line of sight (LOS) of both the TRPs and the rank per TRP (i.e., the maximum number of layers that the UE can receive from one TRP) is less than the transmit antennas available at each TRP, such that the UE can receive more layers than the single TRP can deliver. This technique can also be beneficial when the maximum number of layers a TRP can transmit is lower than the number of layers the UE can receive. In such case, utilizing more than one TRP can increase the spectral efficiency of the communication to the UE.

This type of NC-JT is also supported in LTE with two TRPs. For CSI feedback, a UE is configured with a CSI process having two NZP CSI-RS resources (i.e., one for each TRP) and one interference measurement resource. The UE may report one of the following:

- CRI=0, which indicates that CSI is calculated and reported only for the first NZP CSI-RS resource (i.e., RI, PMI, and CQI associated with the first NZP CSI-RS resource is reported). This is the case when the UE sees best throughput is achieved by transmitting a PDSCH over the TRP or beam associated with the first NZP CSI-RS resource.
- CRI=1, which indicates that CSI is calculated and reported only for the second NZP CSI-RS resource (i.e., RI, PMI, and CQI associated with the second NZP CSI-RS resource is reported). This is the case when the UE sees best throughput is achieved by transmitting a PDSCH over the TRP or beam associated with the second NZP CSI-RS resource.
- CRI=2, which indicates that CSI is calculated and reported for both of the two NZP CSI-RS resources. In this case, two set of CSIs, each for one CW, are calculated and reported based on the two NZP CSI-RS resources and by considering inter-CW interference caused by the other CW. The combinations of reported RIs are restricted such that |RI1-RI2|≤1, where RI1 and RI2 correspond to ranks associated with the first and second NZP CSI-RS, respectively.

Figure 9B:
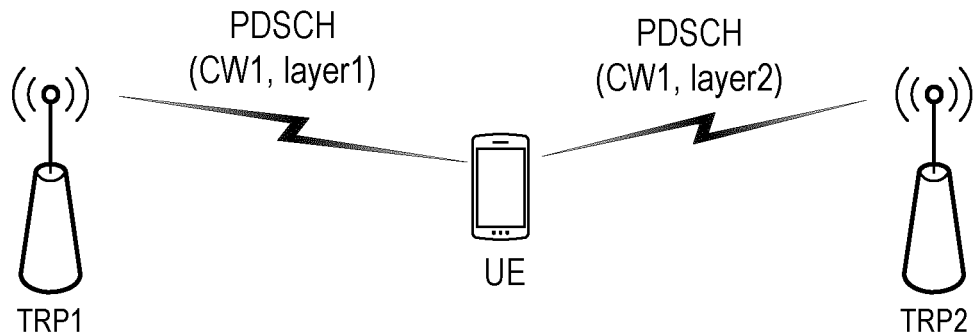

In NR Rel-16, a different NCJT approach is adopted where a single CW is transmitted across multiple TRPs. FIG. 9B shows another exemplary NCJT configuration in which a PDSCH is sent to a UE from two TRPs, each carrying a different MIMO layer of a single CW.

An enhancement of NCJT under consideration for NR Rel-17 is group-based beam reporting, whereby a UE can report N>1 beam groups and M>1 beams per group in a single CSI report, including beams within a group that can be received simultaneously by the UE. There are some existing techniques for group based beam reporting for multiple TRPs. One such technique includes an indication signaled from gNB to UE with information about which DL-RS are transmitted form the same and/or different TRPs. The UE can use this information to enhance group-based beam reporting by including beams associated with two different TRPs in a beam group. This improves the possibility to perform NC-JT and dynamic point selection.

The following options are under consideration for the group-based beam reporting in NR Rel-17:

1. In a CSI-report, UE can report N>1 pair/groups and M≥1 beams per pair/group.
   Different beams in different pairs/groups can be received simultaneously.
   For further study (FFS) whether M is same or different across different pairs/groups.
2. In a CSI-report, UE can report N≥1 pairs/groups and M>1 beams per pair/group.
   Different beams within a pair/group can be received simultaneously.
3. UE report M≥1 beams in N>1 CSI-reports corresponding to N report settings.
   Different beams in different CSI-reports can be received simultaneously.
   FFS whether/how to introduce an association between different CSI-reports.
   FFS whether/how to differentiate reported measurements for beams that are received simultaneously vs. beams that are not received simultaneously, such as whether/how to introduce an indication along with the CSI-reports to indicate whether the beams in different CSI-reports can be received simultaneously.

The following issues related to the above options for group-based beam reporting have not been specified and/or are FFS:

- Values of N and M in each option.
- Association between different beams in above options and different TRP/UE panels.
- Identify new use cases per option compared with R16 (including backhaul).
- Whether different beams in different pairs/groups/reports can be received by same spatial filter per option.

Additionally, multiple options are under consideration for channel measurement resource (CMR) resource set configuration in group-based reporting for NR Rel-17. In general, a CMR corresponds to a NZP CSI-RS resource used for measuring a channel by the UE. These options include:

A. Retain the existing CSI framework, where a CSI-resource setting consists of a single CMR resource set. Different CMR resources can be associated to different TRPs. A UE is allowed to report beams associated with different TRPs. A TRP-identifier is needed for each CMR resource.
B. Slightly modify the CSI framework, such that a CSI-resource setting consists of multiple CMR resource sets. Each CMR resource set is associated with a different TRP. A UE is allowed to report beam pair/group(s) consisting of beams associated with different TRPs.

Option 2 above for group-based beam reporting arrangement is based on the Rel-16 definition, which means that a CSI report consists of a pair/group of N=2 beams that can be received simultaneously by the UE. A goal of option 2 is to extend the number of beam pairs/groups beyond one. Signaling techniques for efficient reporting of a CSI report according to option 2 are still undecided. Furthermore, if CMR configuration option B above is adopted, this will add more undesired complexity to CSI reporting.

Accordingly, embodiments of the present disclosure provide flexible and efficient techniques that enable and/or facilitate efficient signaling of group-based beam reporting for multi-TRP (mTRP) scenarios. Such techniques can reduce signaling overhead for individual CSI reports, thereby facilitating faster CSI reporting by individual UEs and/or capacity for more CSI reports, thereby improving beam management operations.

The term "TRP" may be used in the following discussion to refer to a hardware element associated with a base station. However, this term may also refer to or be associated with a logical set of resources, such as:

- a TRP identifier configured for each SSB or NZP CSI-RS (e.g., option A above); or
- a SSB resource set or a NZP CSI-RS resource set (e.g., option B above).

The following description is based on a UE being configured for group-based beam reporting, such that the UE should report N groups of beams, with each group including two beams that can be received simultaneously by the UE. The following description also based on the UE performing measurements on two sets of DL-RS. An applicable scenario is where a gNB can transmit at most one DL RS in each group, which could be the case where a first set of DL-RS is associated with a first TRP (or gNB panel) and a second set of DL-RS is associated with a second TRP (or gNB panel).

Figure 10:
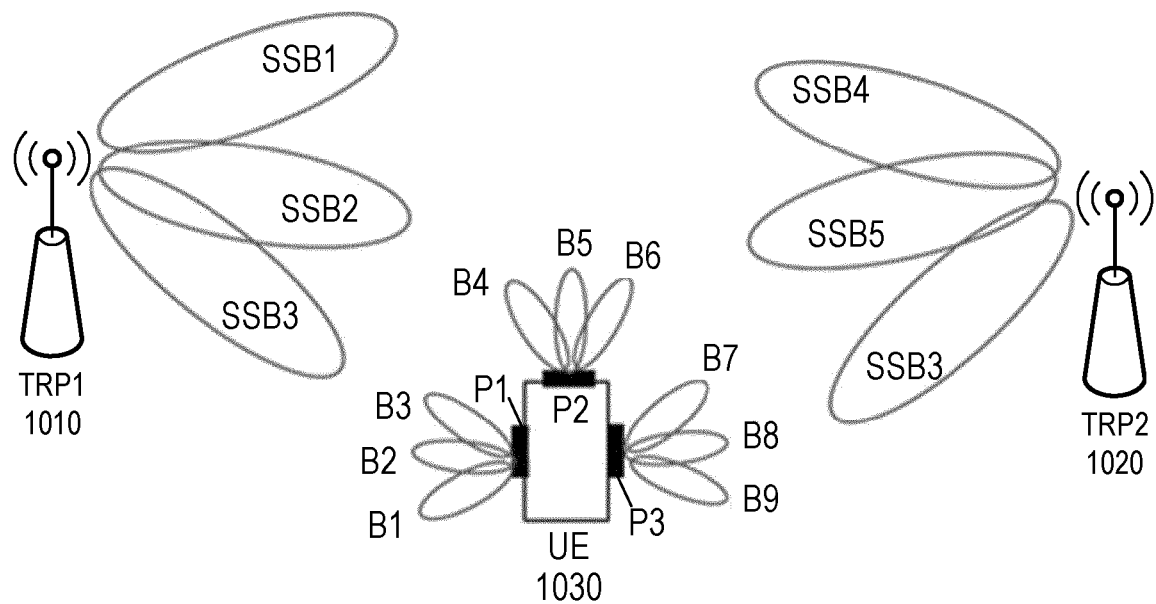
FIG. 10 shows an exemplary arrangement of two TRPs and a UE, according to various embodiments of the present disclosure.

FIG. 10 shows an exemplary arrangement of two TRPs and a UE that illustrates this scenario. In FIG. 10, a gNB has indicated to the UE (1030) that a first set of DL-RS (SSB1, SSB2, SSB3) comes from TRP1 (1010) and a second set of DL-RS (SSB4,SSB5,SSB6) comes from a TRP2 (1020). The arrangement shown in FIG. 10 will be used as a basis for the following description and explanation of various embodiments of the present disclosure.

Note that a beam group corresponds to a transmission hypothesis. If a gNB transmits two signals (e.g., PDCCH DM-RS, PDSCH DM-RS, NZP CSI-RS) simultaneously, and if the first signal uses the first reported DL-RS in a group as QCL source and the second signal uses the second reported DL-RS in the same group as QCL reference, the UE can receive both signals simultaneously.

In some embodiments, the UE's group-based beam report includes one DL-RS from each of the M resource sets (corresponding to M TRPs) for each beam group in the report. Below is an exemplary structure of a beam report (M=2) according to these embodiments, in which the UE reports three beam groups (1, 2, 3):

Beam report
    Group ID 1
        SSB1, RSRP1
        SSB4, RSRP4
    Group ID 2
        SSB2, RSRP2
        SSB5, RSRP5
    Group ID 3
        SSB2, RSRP2
        SSB4, RSRP4

Note that the RSRP for each beam can be either absolute or relative/differential (e.g., to RSRP of the strongest beam). In some embodiments, absolute RSRP can be reported for the first DL-RS in the first group. The RSRPs corresponding to the remaining DL-RSs (e.g., second DL-RS in the first group and the DL-RSs in groups other than the first group) can be reported as relative RSRPs with respect to the absolute RSRP reported for the first DL-RS in the first group. Note that RSRP is given as an exemplary measurement quantity or metric, but other relevant measurement quantities or metrics (e.g., SINR) can be reported instead of RSRP.

In a variant of the above, the UE's group-based beam report includes one DL-RS from each of M TRP identifiers.

In the example above, certain DL-RS are reported multiple times in different groups: SSB2 in Group IDs 2 and 3, SSB4 in Group IDs 1 and 3. This means that the same RSRP is reported twice for the same beam/DL-RS, which requires extra signaling overhead. In some embodiments, RSRP for any particular beam/DL-RS is included at most once in a UE report. For instance, when the same DL-RS is included in multiple beam groups, the RSRP is only reported in the beam group with the smallest beam group ID. In this way, the number of required bits in the beam report can be reduced. Below is an exemplary structure of a beam report (M=2) according to these embodiments, in which the UE reports three beam groups (1, 2, 3):

Beam report
    Group ID 1
        SSB1, RSRP1
        SSB4, RSRP4
    Group ID 2
        SSB2, RSRP2
        SSB5, RSRP5
    Group ID 3
        SSB2
        SSB4

As can be seen above, the reported information for Group ID 3 does not include RSRPs reported in association with Group IDs 1 and 2.

One consequence of not including the RSRP in multiple groups is that the number of required bits in the beam report (i.e., uplink control information, UCI, associated with the beam report) will be variable. For instance, if SSB6 is included in Group 3 instead of SSB2, then the beam report will require a different number of bits since an RSRP value has to be reported for SSB6. Such varying numbers of bits in the beam report will increase the decoding complexity at the gNB, which is not aware in advance of the UCI payload of the beam report.

To alleviate this difficulty, one solution is to split the beam report into two parts: a first part that includes information that helps the gNB determine the UCI size, and a second part that includes components with different number of RSRPs reported in different Group IDs. Below is an example of a beam report according to these embodiments:

Beam report
    Part 1
        Number of absolute RSRPs reported in Group ID 1=1
        Number of absolute RSRPs reported in Group ID 2=0
        Number of absolute RSRPs reported in Group ID 3=0
        Number of relative RSRPs reported in Group ID 1=1, Number of relative RSRPs reported in Group ID 2=2,
Number of relative RSRPs reported in Group ID 3=0
Part 2
  Group ID 1
    SSB1, RSRP1 (absolute)
    SSB4, RSRP4 (relative)
  Group ID 2
    SSB2, RSRP2 (relative)
    SSB5, RSRP5 (relative)
  Group ID 3
    SSB2
    SSB4

Note that indicating the number of absolute and relative RSRPs per Group ID is needed here as different number of bits are used for absolute RSRPs and relative RSRPs. For example, according to 3GPP TS 38.212, seven bits are used for absolute RSRP and four bits are used for relative RSRP. Thus, from part 1, the number of absolute and relative RSRPs in part 2 are known, and which informs the gNB about the number of UCI bits in the beam report.

In some embodiments, if there is a rule and/or predetermined requirement that absolute RSRP is only reported for the first DL-RS of the first group (e.g., Group ID 1), then number of absolute RSRPs per group does not need to be included in part 1 of the beam report.

Although the embodiments described above include explicit beam group IDs, these can be indicated implicitly in other embodiments. In other words, bits used to report DL-RS indexes and corresponding RSRP indexes could be implicitly known based on specification and/or pre-configuration using RRC. Table 2 below illustrates an exemplary structure of a beam report using explicit Group IDs, such as discussed above.

TABLE 2

| DL-RS index | DL performance measure | Explicit beam group ID |
| --- | --- | --- |
| 1 | RSRP 1 | 1 |
| 4 | RSRP 4 | |
| 2 | RSRP 2 | 2 |
| 5 | RSRP 5 | |
| 3 | RSRP 3 | 3 |
| 6 | RSRP 6 | |

The exemplary beam report shown in Table 2 can be modified to use dedicated bitfields to report DL-RS/beams and RSRPs for each beam group. For example, such a report can include 12 bitfields arranged as follows:
  Bitfields 1 and 2 indicates DL-RS indices for beam group 1.
  Bitfields 3 and 4 indicates DL-RS indices for beam group 2.
  Bitfields 5 and 6 indicates DL-RS indices for beam group 3.
  Bitfields 7 and 8 indicates RSRP for DL-RS 1 and 2.
  Bitfields 9 and 10 indicates RSRP for DL-RS 3 and 4.
  Bitfields 11 and 12 indicates RSRP for DL-RS 5 and 6.

In a similar manner as discussed above, RSRP for any particular beam/DL-RS can be included at most once in a UE report. For example, an RSRP bitfield allocated for a DL-RS can be excluded the second and subsequent times the DL-RS appears in beam groups in the beam report. The receiving gNB can interpret this exclusion implicitly as the same RSRP value conveyed by the bitfield associated with the first appearance of the DL-RS in the beam report. This interpretation can be part of a 3GPP specification and/or pre-configured using RRC signaling.

In the above-described embodiments, the UE does not inform the gNB about whether the UE has applied the same or different UE antenna panels for the two reported beams within each beam group. For example, although 3GPP specifications state that a UE should be able to receive the two reported beams simultaneously, it is possible that the UE use the same beam on the same UE panel when receiving both beams in a beam group (e.g., analog beamforming).

In such case, the gNB will be unable to perform NC-JT from the two TRPs with rank higher than two (2), assuming that each UE panel has maximum two RX chains. Since the gNB is not aware of this limitation and/or restriction, it may try to schedule the UE with further CSI reporting from both TRPs in order to facilitate NC-JT that is not feasible, causing unnecessary signaling overhead. In some embodiments, the UE can indicate in the CSI report if the two reported beams belonging to the same beam group are received with the same or different UE panels.

As shown in FIG. 10, the UE has three virtual panels (P1-P3), each of which can generate three different beams of a total of nine beams (labelled B1-B9). In these embodiments, the UE's group-based beam report can include for each reported DL-RS/beam a virtual UE panel index (P1, P2, or P3) used to receive the DL-RS/beam. In this way, the gNB will know for each reported beam group if the same or different UE panel ID has been used by the UE to receive the two beams of the beam group. Table 3 below illustrates an exemplary structure of a beam report according to these embodiments.

TABLE 3

| DL-RS index | DL performance measure | Virtual UE panel ID | Beam group |
| --- | --- | --- | --- |
| SSB3 | RSRP 3 | P1 | 1 |
| SSB6 | RSRP 6 | P3 | |
| SSB2 | RSRP 2 | P2 | 2 |
| SSB5 | RSRP 5 | P2 | |
| SSB3 | RSRP 3 (already included) | P1 (already included) | 3 |
| SSB5 | RSRP 5 (already included) | P2 (already included) | |

Note that in case a DL-RS is signaled multiple times, the virtual panel ID can be removed from the report in a similar way as the RSRP. This is shown in Table 3 as "already included". Note that removing virtual panel IDs for DL-RSs signaled multiple times can lead to varying number of bits in the beam report (e.g., UCI size), in a similar manner as discussed above for RSRPs. The two-part beam reporting structure discussed above can be used to alleviate this difficulty, with the number of virtual panel IDs included with each Group ID being reported in part 1 and the SSBs/RSRPs/virtual panel IDs included in part 2.

Even so, indicating virtual panel ID for each reported beam (as in Table 3 above) requires substantial signaling overhead. In the example shown in FIG. 10, the UE has 9 different UE panels, such that four (4) bits are needed to report the virtual panel ID for each reported beam. Reporting four beam groups with two beams per group requires signaling overhead of 32 bits. One way to mitigate this problem is to use a single bit or flag to indicate whether the same UE panel or different UE panels was/were used for the two reported beams of the beam group. This requires only one bit per reported beam group. Table 4 below illustrates an exemplary structure of a beam report according to these embodiments.

TABLE 4

| DL-RS index | DL performance measure | Same or different UE panel | Beam group |
| --- | --- | --- | --- |
| SSB3 | RSRP 3 | Different | 1 |
| SSB6 | RSRP 6 | | |
| SSB2 | RSRP 2 | Same | 2 |
| SSB5 | RSRP 5 | | |
| SSB3 | RSRP 3 (already included) | Different | 3 |
| SSB5 | RSRP 5 (already included) | | |

It is possible that a UE turns off one of its two RX panels (e.g., two of the four RX chains) to reduce energy consumption. The UE might have only one active UE RX panel at any given time during the SSB RSRP measurements, but still report SSB beams (and measured RSRP) from multiple different UE panels since the UE will activate different panels at different times during SSB reception. It would be useful for the gNB to know if the UE has one or two RX panels active, which in some embodiments can be indicated in the UE's beam report. Table 5 below illustrates an exemplary structure of a beam report according to these embodiments, which includes a flag (e.g., 1 bit) indicating if 1 or 2 panels were active for the UE reception.

TABLE 5

| DL-RS index | DL performance measure | Same or different UE panel | Beam group | UE panels for simultaneous reception |
| --- | --- | --- | --- | --- |
| SSB3 | RSRP 3 | Different | 1 | 2 |
| SSB6 | RSRP 6 | | | |
| SSB2 | RSRP 2 | Same | 2 | |
| SSB5 | RSRP 5 | | | |
| SSB3 | RSRP 3 (already included) | Different | 3 | |
| SSB5 | RSRP 5 (already included) | | | |

As mentioned above earlier, if two signals are received at the same panel, the UE will only be able to receive a signal with a rank that equals the maximum number of Rx chains connected to one panel (e.g., 2). If the two signals are received at different panels, the maximum rank of the received signal may be larger (e.g., 4). Accordingly, in some embodiments, rather than signaling a virtual panel ID as discussed above, the UE can include in the beam report a maximum rank for each beam group. Table 6 below illustrates an exemplary structure of a beam report according to these embodiments.

TABLE 6

| DL-RS index | DL performance measure | Max rank | Beam group |
| --- | --- | --- | --- |
| SSB3 | RSRP 3 | 4 | 1 |
| SSB6 | RSRP 6 | | |
| SSB2 | RSRP 2 | 2 | 2 |
| SSB5 | RSRP 5 | | |
| SSB3 | RSRP 3 (already included) | 2 | 3 |
| SSB5 | RSRP 5 (already included) | | |

Although a UE performs measurements on many DL-RSs and can form a many groups, a beam report can include only a limited number of groups due to signaling constraints. As such, the UE may be required to select a subset of the possible beam groups. In some embodiments, the UE sorts the groups based on the sum of the two RSRP values per group and selects some number of beam groups having the highest sums. In other embodiments, the UE sorts the groups based on max rank and selects some number of beam groups having the highest max ranks. The number of groups to be selected can either be configured by the gNB or determined by the UE.

In some embodiments, when two sets of DL-RS are configured for a group-based CSI report, it is assumed by the gNB that the two DL-RS/beams in each group are associated with different Rx panels at the UE such that no additional signaling is needed. The group-based CSI request from the gNB can trigger activation of multiple Rx panels at the UE, such that the UE performs measurements based on the two sets of DL-RS/beams only after multiple Rx panels are activated. The required activation time may be signaled by the UE to the gNB as part of UE capabilities, and the gNB can use this information to determine a time offset between a CSI request and the expected CSI report from the UE. Alternatively, the activation time may be pre-determined as part of 3GPP specifications.

The number of beam groups to be reported may be configured by the gNB as part of the group-based CSI report configuration provided to the UE. Alternatively, a maximum number of groups may be configured by the gNB and the actual number of reported groups may be determined by the UE based on certain criterion (e.g., RSRP difference between beams in a group<10 dB) subject to the maximum. When the actual number of reported groups is UE-determined the beam report may have varying number of bits. To alleviate these difficulties, the number of groups reported can be included in part 1 of the beam report, in a similar manner as other information discussed above.

Figure 11:
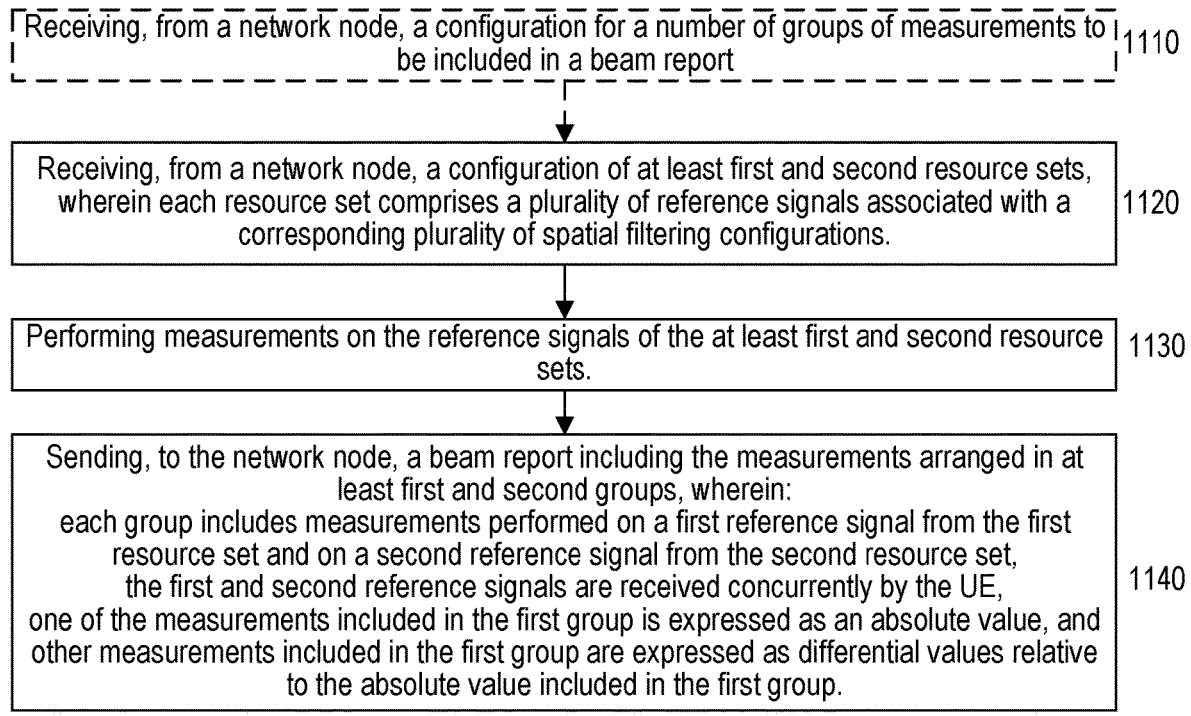
FIG. 11 shows a flow diagram of an exemplary method (e.g., procedure) for a UE (e.g., wireless device), according to various embodiments of the present disclosure.
Figure 12:
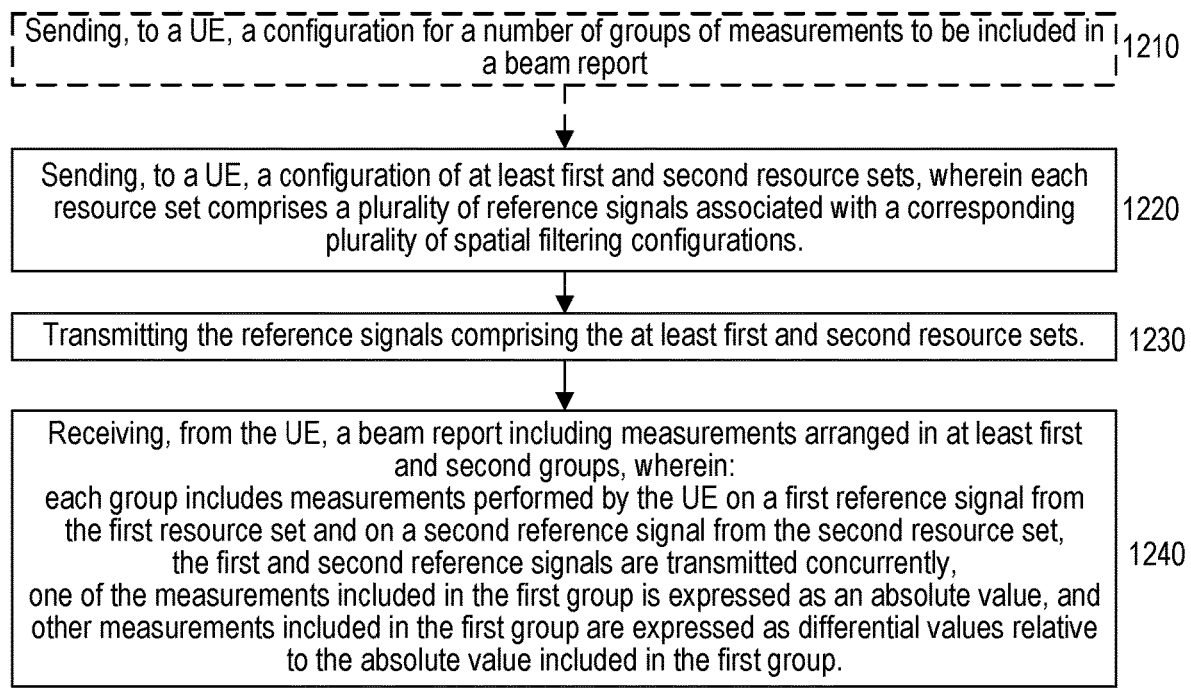
FIG. 12 shows a flow diagram of an exemplary method (e.g., procedure) for a network node (e.g., base station, eNB, gNB, ng-eNB, etc.), according to various embodiments of the present disclosure.

The embodiments described above are further illustrated in FIGS. 11-12, which show exemplary methods (e.g., procedures) for a UE and a network node, respectively. In other words, various features of the operations described below correspond to various embodiments described above. Furthermore, the exemplary methods shown in FIGS. 11-12 can be used cooperatively to provide various exemplary benefits described herein. Although FIGS. 11-12 show specific blocks in particular orders, the operations of the exemplary methods can be performed in different orders than shown and can be combined and/or divided into blocks having different functionality than shown. Optional blocks or operations are indicated by dashed lines.

In particular, FIG. 11 shows an exemplary method (e.g., procedure) for beam reporting in a wireless network (e.g., E-UTRAN, NG-RAN), according to various embodiments of the present disclosure. The exemplary method can be performed by a UE (e.g., wireless device, IoT device, etc.) such as described elsewhere herein.

The exemplary method can include the operations of block 1120, where the UE can receive, from a network node of the wireless network, a configuration of at least first and second resource sets. Each resource set comprises a plurality of reference signals. The reference signals in each resource set are associated with respective spatial filtering configurations. In other words, each reference signal has a corresponding spatial filtering configuration. In some variants, each of the spatial filtering configurations associated with a resource set may unique, i.e., different from other spatial filtering configurations associated with the same resource set.

The exemplary method can also include the operations of block 1130, where the UE can perform measurements on the reference signals of the at least first and second resource sets. The exemplary method can also include the operations of block 1140, where the UE can send, to the network node, a beam report including the measurements arranged in at least first and second groups.

More specifically, each group includes measurements performed on a first reference signal from the first resource set and on a second reference signal from the second resource set. The first and second reference signals are received concurrently by the UE. One of the measurements included in the first group is expressed as an absolute value, while other measurements included in the first group are expressed as differential values relative to the absolute value included in the first group.

In some embodiments, each resource set is associated with one TRP, i.e., the respective resources sets are associated with respective TRPs.

In some embodiments, the measurement in the first group expressed as the absolute value is a measurement of the first reference signal in the first resource set. In some embodiments, other measurements in the first group expressed as the differential values include one or more measurements of the second reference signal in the second resource set. In some embodiments, the measurements included in the second group are expressed as differential values relative to the absolute value included in the first group. In some embodiments, each group includes measurements performed on at most one reference signal from each of the resource sets.

In some embodiments, for each group, the beam report also includes respective reference signal identifiers associated with the first and second reference signals. In some of these embodiments, the beam report is arranged into a plurality of preconfigured bitfields and each group of measurements is arranged according to the following:
- a first bitfield that includes the measurement of the first reference signal;
- a second bitfield that includes the reference signal identifier associated with the first reference signal;
- a third bitfield that includes the measurement of the second reference signal; and
- a fourth bitfield that includes the reference signal identifier associated with the second reference signal.

In some embodiments, the exemplary method can also include the operations of block 1110, where the UE can receive, from the network node, a configuration for a number of groups of measurements to be included in a beam report. In such case, the at least first and second groups are included in the beam report (e.g., sent in block 1140) in accordance with the configured number. In some of these embodiments, the configuration for the number of groups is included in a setting for CSI reporting.

In some embodiments, each of the reference signals can be one of the following: channel state information reference signal (CSI-RS), or synchronization signal/PBCH block (SSB). In some embodiments, each of the measurements on the reference signals is one of the following: reference signal received power (RSRP), or signal-to-interference-and-noise ratio (SINR).

In addition, FIG. 12 shows an exemplary method (e.g., procedure) for beam management in a wireless network, according to various embodiments of the present disclosure. The exemplary method can be performed by a network node (e.g., base station, eNB, gNB, ng-eNB, etc., or component thereof) such as described elsewhere herein.

The exemplary method can include the operations of block 1220, where the network node can send, to a UE, a configuration of at least first and second resource sets. Each resource set comprises a plurality of reference signals. The reference signals in each resource set are associated with respective spatial filtering configurations. In other words, each reference signal has a corresponding spatial filtering configuration. In some variants, each of the spatial filtering configurations associated with a resource set may unique, i.e., different from other spatial filtering configurations associated with the same resource set.

The exemplary method can also include the operations of block 1230, where the network node can transmit the reference signals comprising the at least first and second resource sets. The exemplary method can also include the operations of block 1240, where the network node can receive, from the UE, a beam report including measurements arranged in at least first and second groups.

More specifically, each group includes measurements performed by the UE on a first reference signal from the first resource set and on a second reference signal from the second resource set. The first and second reference signals are transmitted concurrently. One of the measurements included in the first group is expressed as an absolute value, while other measurements included in the first group are expressed as differential values relative to the absolute value included in the first group.

In some embodiments, each resource set is associated with one TRP, i.e., the respective resources sets are associated with respective TRPs. Put differently, the network node can transmit the reference signals comprising the respective resources sets via respective TRPs.

In some embodiments, the measurement in the first group expressed as the absolute value is a measurement of the first reference signal in the first resource set. In some embodiments, other measurements in the first group expressed as the differential values include one or more measurements of the second reference signal in the second resource set. In some embodiments, the measurements included in the second group are expressed as differential values relative to the absolute value included in the first group. In some embodiments, each group includes measurements performed on at most one reference signal from each of the resource sets.

In some embodiments, for each group, the beam report also includes respective reference signal identifiers associated with the first and second reference signals. In some of these embodiments, the beam report is arranged into a plurality of preconfigured bitfields and each group of measurements is arranged according to the following:
- a first bitfield that includes the measurement of the first reference signal;
- a second bitfield that includes the reference signal identifier associated with the first reference signal;
- a third bitfield that includes the measurement of the second reference signal; and
- a fourth bitfield that includes the reference signal identifier associated with the second reference signal.

In some embodiments, the exemplary method can also include the operations of block 1210, where the network node can send, to the UE, a configuration for a number of groups of measurements to be included in a beam report. In such case, the at least first and second groups are included in the beam report (e.g., received in block 1240) in accordance with the configured number. In some of these embodiments, the configuration for the number of groups is included in a setting for CSI reporting.

In some embodiments, each of the reference signals can be one of the following: CSI-RS, or SSB. In some embodiments, each of the measurements on the reference signals is one of the following: RSRP, or SINR.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 13:
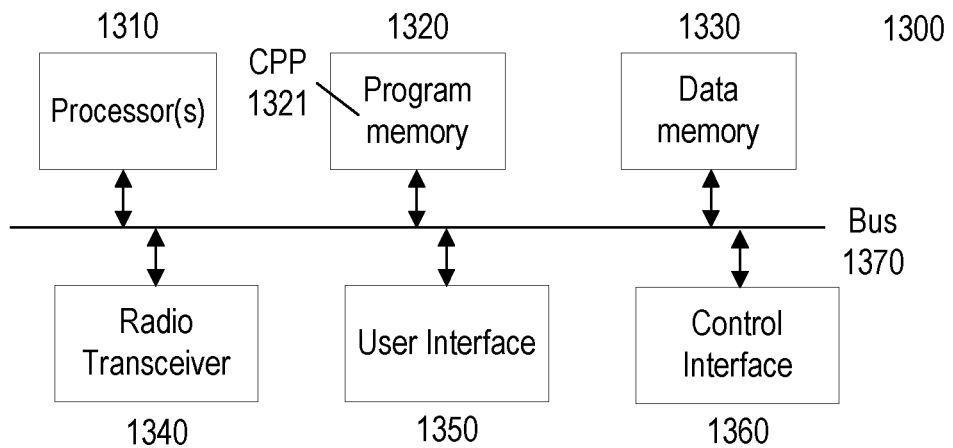
FIG. 13 shows a block diagram of an exemplary wireless device or UE, according to various embodiments of the present disclosure.

FIG. 13 shows a block diagram of an exemplary wireless device or user equipment (UE) 1300 (hereinafter referred to as "UE 1300") according to various embodiments of the present disclosure, including those described above with reference to other figures. For example, UE 1300 can be configured by execution of instructions, stored on a computer-readable medium, to perform operations corresponding to one or more of the exemplary methods described herein.

UE 1300 can include a processor 1310 (also referred to as "processing circuitry") that can be operably connected to a program memory 1320 and/or a data memory 1330 via a bus 1370 that can comprise parallel address and data buses, serial ports, or other methods and/or structures known to those of ordinary skill in the art. Program memory 1320 can store software code, programs, and/or instructions (collectively shown as computer program product 1321 in FIG. 13) that, when executed by processor 1310, can configure and/or facilitate UE 1300 to perform various operations, including operations corresponding to various exemplary methods described herein. As part of or in addition to such operations, execution of such instructions can configure and/or facilitate UE 1300 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 1340, user interface 1350, and/or control interface 1360.

As another example, processor 1310 can execute program code stored in program memory 1320 that corresponds to MAC, RLC, PDCP, and RRC layer protocols standardized by 3GPP (e.g., for NR and/or LTE). As a further example, processor 1310 can execute program code stored in program memory 1320 that, together with radio transceiver 1340, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1310 can execute program code stored in program memory 1320 that, together with radio transceiver 1340, implements device-to-device (D2D) communications with other compatible devices and/or UEs.

Program memory 1320 can also include software code executed by processor 1310 to control the functions of UE 1300, including configuring and controlling various components such as radio transceiver 1340, user interface 1350, and/or control interface 1360. Program memory 1320 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1320 can comprise an external storage arrangement (not shown) remote from UE 1300, from which the instructions can be downloaded into program memory 1320 located within or removably coupled to UE 1300, so as to enable execution of such instructions.

Data memory 1330 can include memory area for processor 1310 to store variables used in protocols, configuration, control, and other functions of UE 1300, including operations corresponding to, or comprising, any of the exemplary methods described herein. Moreover, program memory 1320 and/or data memory 1330 can include non-volatile memory (e.g., flash memory), volatile memory (e.g., static or dynamic RAM), or a combination thereof. Furthermore, data memory 1330 can comprise a memory slot by which removable memory cards in one or more formats (e.g., SD Card, Memory Stick, Compact Flash, etc.) can be inserted and removed.

Persons of ordinary skill will recognize that processor 1310 can include multiple individual processors (including, e.g., multi-core processors), each of which implements a portion of the functionality described above. In such cases, multiple individual processors can be commonly connected to program memory 1320 and data memory 1330 or individually connected to multiple individual program memories and or data memories. More generally, persons of ordinary skill in the art will recognize that various protocols and other functions of UE 1300 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1340 can include radio-frequency transmitter and/or receiver functionality that facilitates the UE 1300 to communicate with other equipment supporting like wireless communication standards and/or protocols. In some embodiments, the radio transceiver 1340 includes one or more transmitters and one or more receivers that enable UE 1300 to communicate according to various protocols and/or methods proposed for standardization by 3GPP and/or other standards bodies. For example, such functionality can operate cooperatively with processor 1310 to implement a PHY layer based on OFDM, OFDMA, and/or SC-FDMA technologies, such as described herein with respect to other figures.

In some embodiments, radio transceiver 1340 includes one or more transmitters and one or more receivers that can facilitate the UE 1300 to communicate with various LTE, LTE-Advanced (LTE-A), and/or NR networks according to standards promulgated by 3GPP. In some embodiments of the present disclosure, the radio transceiver 1340 includes circuitry, firmware, etc. necessary for the UE 1300 to communicate with various NR, NR-U, LTE, LTE-A, LTE-LAA, UMTS, and/or GSM/EDGE networks, also according to 3GPP standards. In some embodiments, radio transceiver 1340 can include circuitry supporting D2D communications between UE 1300 and other compatible devices.

In some embodiments, radio transceiver 1340 includes circuitry, firmware, etc. necessary for the UE 1300 to communicate with various CDMA2000 networks, according to 3GPP2 standards. In some embodiments, the radio transceiver 1340 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1340 can include a transceiver that is capable of wired communication, such as by using IEEE 802.3 Ethernet technology. The functionality particular to each of these embodiments can be coupled with and/or controlled by other circuitry in the UE 1300, such as the processor 1310 executing program code stored in program memory 1320 in conjunction with, and/or supported by, data memory 1330.

User interface 1350 can take various forms depending on the particular embodiment of UE 1300, or can be absent from UE 1300 entirely. In some embodiments, user interface 1350 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1300 can comprise a tablet computing device including a larger touchscreen display. In such embodiments, one or more of the mechanical features of the user interface 1350 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1300 can be a digital computing device, such as a laptop computer, desktop computer, workstation, etc. that comprises a mechanical keyboard that can be integrated, detached, or detachable depending on the particular embodiment. Such a digital computing device can also comprise a touch screen display. Many embodiments of the UE 1300 having a touch screen display are capable of receiving user inputs, such as inputs related to exemplary methods described herein or otherwise known to persons of ordinary skill.

In some embodiments, UE 1300 can include an orientation sensor, which can be used in various ways by features and functions of UE 1300. For example, the UE 1300 can use outputs of the orientation sensor to determine when a user has changed the physical orientation of the UE 1300's touch screen display. An indication signal from the orientation sensor can be available to any application program executing on the UE 1300, such that an application program can change the orientation of a screen display (e.g., from portrait to landscape) automatically when the indication signal indicates an approximate 130-degree change in physical orientation of the device. In this exemplary manner, the application program can maintain the screen display in a manner that is readable by the user, regardless of the physical orientation of the device. In addition, the output of the orientation sensor can be used in conjunction with various embodiments of the present disclosure.

A control interface 1360 of the UE 1300 can take various forms depending on the particular embodiment of UE 1300 and of the particular interface requirements of other devices that the UE 1300 is intended to communicate with and/or control. For example, the control interface 1360 can comprise an RS-232 interface, a USB interface, an HDMI interface, a Bluetooth interface, an IEEE ("Firewire") interface, an I²C interface, a PCMCIA interface, or the like. In some embodiments of the present disclosure, control interface 1360 can comprise an IEEE 802.3 Ethernet interface such as described above. In some embodiments of the present disclosure, the control interface 1360 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1300 can comprise more functionality than is shown in FIG. 13 including, for example, a video and/or still-image camera, microphone, media player and/or recorder, etc. Moreover, radio transceiver 1340 can include circuitry necessary to communicate using additional radio-frequency communication standards including Bluetooth, GPS, and/or others. Moreover, the processor 1310 can execute software code stored in the program memory 1320 to control such additional functionality. For example, directional velocity and/or position estimates output from a GPS receiver can be available to any application program executing on the UE 1300, including any program code corresponding to and/or embodying any embodiments (e.g., of methods) described herein.

Figure 14:
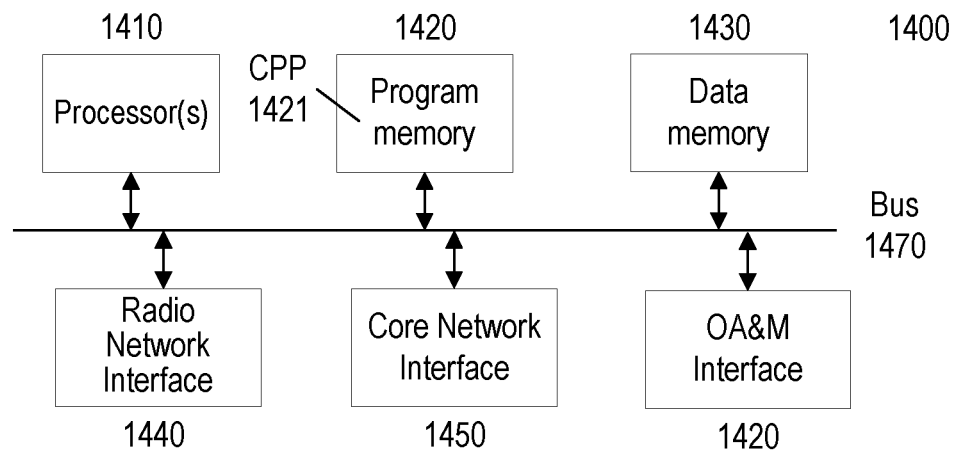
FIG. 14 shows a block diagram of an exemplary network node, according to various embodiments of the present disclosure.

FIG. 14 shows a block diagram of an exemplary network node 1400 according to various embodiments of the present disclosure, including those described above with reference to other figures. For example, exemplary network node 1400 can be configured by execution of instructions, stored on a computer-readable medium, to perform operations corresponding to one or more of the exemplary methods described herein. In some embodiments, network node 1400 can comprise a base station, eNB, gNB, or one or more components thereof. For example, network node 1400 can be configured as a central unit (CU) and one or more distributed units (DUs) according to NR gNB architectures specified by 3GPP. More generally, the functionally of network node 1400 can be distributed across various physical devices and/or functional units, modules, etc.

Network node 1400 can include processor 1410 (also referred to as "processing circuitry") that is operably connected to program memory 1420 and data memory 1430 via bus 1470, which can include parallel address and data buses, serial ports, or other methods and/or structures known to those of ordinary skill in the art.

Program memory 1420 can store software code, programs, and/or instructions (collectively shown as computer program product 1421 in FIG. 14) that, when executed by processor 1410, can configure and/or facilitate network node 1400 to perform various operations, including operations corresponding to various exemplary methods described herein. As part of and/or in addition to such operations, program memory 1420 can also include software code executed by processor 1410 that can configure and/or facilitate network node 1400 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1440 and/or core network interface 1450. By way of example, core network interface 1450 can comprise the S1 or NG interface and radio network interface 1440 can comprise the Uu interface, as standardized by 3GPP. Program memory 1420 can also comprise software code executed by processor 1410 to control the functions of network node 1400, including configuring and controlling various components such as radio network interface 1440 and core network interface 1450.

Data memory 1430 can comprise memory area for processor 1410 to store variables used in protocols, configuration, control, and other functions of network node 1400. As such, program memory 1420 and data memory 1430 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1410 can include multiple individual processors (not shown), each of which implements a portion of the functionality described above. In such case, multiple individual processors may be commonly connected to program memory 1420 and data memory 1430 or individually connected to multiple individual program memories and/or data memories. More generally, persons of ordinary skill will recognize that various protocols and other functions of network node 1400 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1440 can comprise transmitters, receivers, signal processors, ASICs, antennas, beamforming units, and other circuitry that enables network node 1400 to communicate with other equipment such as, in some embodiments, a plurality of compatible user equipment (UE). In some embodiments, interface 1440 can also enable network node 1400 to communicate with compatible satellites of a satellite communication network. In some embodiments, radio network interface 1440 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1440. According to further embodiments of the present disclosure, the radio network interface 1440 can comprise a PHY layer based on OFDM, OFDMA, and/or SC-FDMA technologies. In some embodiments, the functionality of such a PHY layer can be provided cooperatively by radio network interface 1440 and processor 1410 (including program code in memory 1420).

Core network interface 1450 can comprise transmitters, receivers, and other circuitry that enables network node 1400 to communicate with other equipment in a core network such as, in some embodiments, circuit-switched (CS) and/or packet-switched Core (PS) networks. In some embodiments, core network interface 1450 can comprise the S1 interface standardized by 3GPP. In some embodiments, core network interface 1450 can comprise the NG interface standardized by 3GPP. In some embodiments, core network interface 1450 can comprise one or more interfaces to one or more AMFs, SMFs, SGWs, MMES, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1450 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1400 can include hardware and/or software that configures and/or facilitates network node 1400 to communicate with other network nodes in a RAN, such as with other eNBs, gNBs, ng-eNBs, en-gNBs, IAB nodes, etc. Such hardware and/or software can be part of radio network interface 1440 and/or core network interface 1450, or it can be a separate functional unit (not shown). For example, such hardware and/or software can configure and/or facilitate network node 1400 to communicate with other RAN nodes via the X2 or Xn interfaces, as standardized by 3GPP.

OA&M interface 1460 can comprise transmitters, receivers, and other circuitry that enables network node 1400 to communicate with external networks, computers, databases, and the like for purposes of operations, administration, and maintenance of network node 1400 or other network equipment operably connected thereto. Lower layers of OA&M interface 1460 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1440, core network interface 1450, and OA&M interface 1460 may be multiplexed together on a single physical interface, such as the examples listed above.

Figure 15:
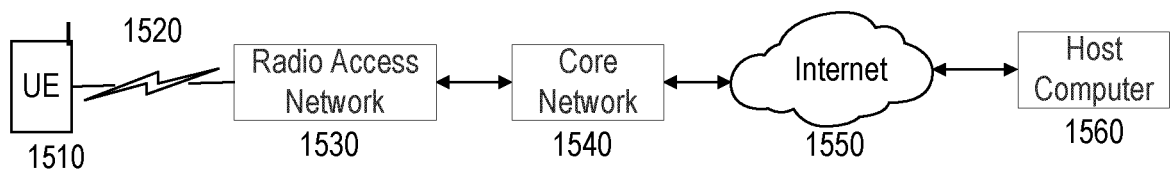
FIG. 15 shows a block diagram of an exemplary network configured to provide over-the-top (OTT) data services between a host computer and a UE, according to various embodiments of the present disclosure.

FIG. 15 is a block diagram of an exemplary communication network configured to provide over-the-top (OTT) data services between a host computer and a user equipment (UE), according to one or more embodiments of the present disclosure. UE 1510 can communicate with radio access network (RAN) 1530 over radio interface 1520, which can be based on protocols described above including, e.g., LTE, LTE-A, and 5G/NR. For example, UE 1510 can be configured and/or arranged as shown in other figures discussed above.

RAN 1530 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1530 can cooperatively operate using licensed and unlicensed spectrum. In some embodiments, RAN 1530 can include, or be capable of communication with, one or more satellites comprising a satellite access network.

RAN 1530 can further communicate with core network 1540 according to various protocols and interfaces described above. For example, one or more apparatus (e.g., base stations, eNBs, gNBs, etc.) comprising RAN 1530 can communicate to core network 1540 via core network interface 1550 described above. In some embodiments, RAN 1530 and core network 1540 can be configured and/or arranged as shown in other figures discussed above. For example, eNBs comprising an E-UTRAN 1530 can communicate with an EPC core network 1540 via an S1 interface. As another example, gNBs and ng-eNBs comprising an NG-RAN 1530 can communicate with a 5GC core network 1530 via an NG interface.

Core network 1540 can further communicate with an external packet data network, illustrated in FIG. 15 as Internet 1550, according to various protocols and interfaces known to persons of ordinary skill in the art. Many other devices and/or networks can also connect to and communicate via Internet 1550, such as exemplary host computer 1560. In some embodiments, host computer 1560 can communicate with UE 1510 using Internet 1550, core network 1540, and RAN 1530 as intermediaries. Host computer 1560 can be a server (e.g., an application server) under ownership and/or control of a service provider. Host computer 1560 can be operated by the OTT service provider or by another entity on the service provider's behalf.

For example, host computer 1560 can provide an over-the-top (OTT) packet data service to UE 1510 using facilities of core network 1540 and RAN 1530, which can be unaware of the routing of an outgoing/incoming communication to/from host computer 1560. Similarly, host computer 1560 can be unaware of routing of a transmission from the host computer to the UE, e.g., the routing of the transmission through RAN 1530. Various OTT services can be provided using the exemplary configuration shown in FIG. 15 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 15 can also include measurement procedures and/or sensors that monitor network performance metrics including data rate, latency and other factors that are improved by embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The embodiments described herein provide flexible and efficient techniques that enable and/or facilitate efficient signaling of group-based beam reporting for multi-TRP (mTRP) scenarios. Such techniques can reduce signaling overhead for individual CSI reports, thereby facilitating faster CSI reporting by individual UEs and/or capacity for more CSI reports, thereby improving beam management operations. When used in NR UEs (e.g., UE 1510) and gNBs (e.g., gNBs comprising RAN 1530), embodiments described herein can increase user data rates by facilitating multi-TRP/multi-beam data transmission to a single UE, based on beam reporting provided according to various embodiments. Consequently, this increases the benefits and/or value of OTT data services provided via multi-TRP/multi-beam arrangements, to both end users and OTT service providers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

A1. A method for beam management by a user equipment (UE) operating in a wireless network, the method comprising:

receiving signals associated with a first plurality of beams transmitted by a second plurality of transmission reception points (TRPs) in the wireless network; and sending, to a network node in the wireless network, a beam report including measurements on the received signals arranged in one or more groups, with each group including measurements on signals that were received concurrently by the UE from different ones of the TRPs.

A2. The method of embodiment A1, wherein each group includes at most one signal received concurrently from each of the TRPs.

A3. The method of any of embodiments A1-A2, wherein the beam report includes:
a group identifier associated with each group; and
for each group, a beam identifier and a measurement associated with each of the signals included in the group.

A4. The method of embodiment A3, wherein when a particular beam identifier and an associated measurement are included in a first group of the beam report, the associated measurement associated is omitted when the particular beam identifier is included in a subsequent second group of the beam report.

A5. The method of embodiment A4, wherein the beam report includes:
a measurement of a first signal in a first group expressed as an absolute value; and
the following expressed as relative to the absolute value:
measurements of other signals included the first group, and
non-omitted measurements of signals included in subsequent groups in the beam report.

A6. The method of embodiment A5, wherein:
the beam report includes a first part and a subsequent second part;
the first part indicates one or more of the following included in each group of measurements:
respective numbers of absolute values, and
respective numbers of relative values; and
the second part includes, for each group:
a group identifier, and
for each signal included in the group, an associated beam identifier and one of the following types of measurement values: absolute, relative, omitted.

A7. The method of embodiment A6, wherein the first part indicates a number of absolute values included in a first group of the beam report but does not indicate respective numbers of absolute values included in subsequent groups of the beam report.

A8. The method of any of embodiments A1-A2, wherein:
the beam report is arranged into a plurality of preconfigured bitfields;
a first number of the bitfields correspond to respective groups; and
each bitfield of the first number includes a plurality of beam identifiers associated with a respective plurality of signals included in the corresponding group.

A9. The method of embodiment A8, wherein:
a second number of the bitfields correspond to respective disjoint sets of the first plurality of beams; and
each bitfield of the second number includes a plurality of measurements of signals associated with beams of the corresponding set.

A10. The method of any of embodiments A8-A9, where the beam report does not include explicit group identifiers.

A11. The method of any of embodiments A1-A10, wherein:
each of the signals is received by one of a plurality of virtual antenna panels of the UE;
the beam report includes one of the following:
respective identifiers of the virtual antenna panels used to receive the respective signals, or
for each group, an indication of whether the same or different virtual antenna panels were used to concurrently receive the signals included the group.

A12. The method of embodiment A11, wherein when a particular beam identifier and an identifier of virtual antenna panel used to receive the associated signal are included in a first group of the beam report, the identifier of virtual antenna panel is omitted when the particular beam identifier is included in a subsequent second group of the beam report.

A13. The method of embodiment A13, wherein:
the beam report includes a first part and a subsequent second part;
the first part indicates respective numbers of antenna virtual panel identifiers included in each group of measurements; and
the second part includes, for each group, a group identifier and, when not omitted, one or more identifiers of the virtual antenna panels used to receive the signals included in the group.

A14. The method of any of embodiments A1-A13, wherein the beam report also indicates one or more of the following:
a number of UE antenna panels active during reception of the signals; and
maximum ranks associated with the respective groups.

A15. The method of any of embodiments A1-A14, further comprising:
sending, to the network node, an indication of a UE capability of minimum activation time for multiple antenna panels; and
receiving, from the network node, a request to initiate measurement of the signals associated with the first plurality of beams, wherein the request indicates an initiation time no sooner than the minimum activation time after the request.

A16. The method of embodiment A15, wherein one of the following applies:
the request is for a number of groups, and measurements for the number of groups are included in the beam report; or
the request is for a maximum number of groups, and the beam report includes an indication how many groups, subject to the maximum number, are included in the beam report.

A17. The method of embodiment A16, further comprising selecting the one or more groups included in the report based one or more of the following:
a function of the measurements of the received signals included in the respective groups; and
maximum ranks associated with the respective groups.

A18. The method of any of embodiments A1-A17, wherein each of the received signals is one of the following: channel state information reference signal (CSI-RS), or synchronization signal/PBCH block (SSB).

A19. The method of any of embodiments A1-A18, wherein each of the measurements on the received signals is one of the following: reference signal received power (RSRP), or signal-to-interference-and-noise ratio (SINR).

B1. A method for beam management by a network node of a wireless network, the method comprising:
transmitting signals associated with a first plurality of beams via a second plurality of transmission reception points (TRPs) in the wireless network; and
receiving, from a user equipment (UE), a beam report including measurements on the transmitted signals arranged in one or more groups, with each group including measurements on signals that were received concurrently by the UE from different ones of the TRPs.

B2. The method of embodiment B1, wherein each group includes at most one signal received concurrently from each of the TRPs.

B3. The method of any of embodiments B1-B2, wherein the beam report includes:
a group identifier associated with each group; and
for each group, a beam identifier and a measurement associated with each of the signals included in the group.

B4. The method of embodiment B3, wherein when a particular beam identifier and an associated measurement are included in a first group of the beam report, the associated measurement associated is omitted when the particular beam identifier is included in a subsequent second group of the beam report.

B5. The method of embodiment B4, wherein the beam report includes:
a measurement of a first signal in a first group expressed as an absolute value; and
the following expressed as relative to the absolute value:
measurements of other signals included the first group;
non-omitted measurements of signals included in subsequent groups in the beam report.

B6. The method of embodiment B5, wherein:
the beam report includes a first part and a subsequent second part;
the first part indicates one or more of the following included in each group of measurements:
respective numbers of absolute values, and
respective numbers of relative values; and
the second part includes, for each group:
a group identifier, and
for each signal included in the group, an associated beam identifier and one of the following types of measurement values: absolute, relative, omitted.

B7. The method of embodiment B6, wherein the first part indicates a number of absolute values include in a first group of the beam report but does not indicate respective numbers of absolute values included in subsequent groups of the beam report.

B8. The method of any of embodiments B1-B2, wherein:
the beam report is arranged into a plurality of preconfigured bitfields;
a first number of the bitfields correspond to respective groups; and
each bitfield of the first number includes a plurality of beam identifiers associated with a respective plurality of signals included in the corresponding group.

B9. The method of embodiment B8, wherein:
a second number of the bitfields correspond to respective disjoint sets of the first plurality of beams; and
each bitfield of the second number includes a plurality of measurements of signals associated with beams of the corresponding set.

B10. The method of any of embodiments B8-B9, where the beam report does not include explicit group identifiers.

B11. The method of any of embodiments B1-B10, wherein:
each of the signals is received by one of a plurality of virtual antenna panels of the UE;
the beam report includes one of the following:
respective identifiers of the virtual antenna panels used to receive the respective signals, or
for each group, an indication of whether the same or different virtual antenna panels were used to concurrently receive the signals included the group.

B12. The method of embodiment B11, wherein when a particular beam identifier and an identifier of virtual antenna panel used to receive the associated signal are included in a first group of the beam report, the identifier of virtual antenna panel is omitted when the particular beam identifier is included in a subsequent second group of the beam report.

B13. The method of embodiment B13, wherein:
the beam report includes a first part and a subsequent second part;
the first part indicates respective numbers of antenna virtual panel identifiers included in each group of measurements; and
the second part includes, for each group, a group identifier and, when not omitted, one or more identifiers of the virtual antenna panels used to receive the signals included in the group.

B14. The method of any of embodiments B1-B13, wherein the beam report also indicates one or more of the following:
a number of UE antenna panels active during reception of the signals; and
maximum ranks associated with the respective groups.

B15. The method of any of embodiments B1-B14, further comprising:
receiving, from the UE, an indication of a UE capability of minimum activation time for multiple antenna panels; and
transmitting, to the UE, a request to initiate measurement of the signals associated with the first plurality of beams, wherein the request indicates an initiation time no sooner than the minimum activation time after the request.

B16. The method of embodiment B15, wherein one of the following applies:
the request is for a number of groups, and measurements for the number of groups are included in the beam report; or
the request is for a maximum number of groups, and the beam report includes an indication how many groups, subject to the maximum number, are included in the beam report.

B17. The method of any of embodiments B1-B16, wherein each of the transmitted signals is one of the following: channel state information reference signal (CSI-RS), or synchronization signal/PBCH block (SSB).

B18. The method of any of embodiments B1-B17, wherein each of the measurements on the transmitted signals is one of the following: reference signal received power (RSRP), or signal-to-interference-and-noise ratio (SINR).

C1. A user equipment (UE) configured for beam management a wireless network, the UE comprising:
radio transceiver circuitry configured to communicate with a network node and to receive signals from a plurality of transmission reception points (TRPs); and
processing circuitry operatively coupled to the radio transceiver circuitry, whereby the processing circuitry and the radio transceiver circuitry are configured to perform operations corresponding to any of the methods of embodiments A1-A19.

C2. A user equipment (UE) configured for beam management a wireless network, the UE being further configured to perform operations corresponding to any of the methods of embodiments A1-A19.

C3. A non-transitory, computer-readable medium storing computer-executable instructions that, when executed by processing circuitry of a user equipment (UE) configured for beam management a wireless network, configure the UE to perform operations corresponding to any of the methods of embodiments A1-A19.

C4. A computer program product comprising computer-executable instructions that, when executed by processing circuitry of a user equipment (UE) configured for beam management a wireless network, configure the UE to perform operations corresponding to any of the methods of embodiments A1-A19.

D1. A network node configured for beam management in a wireless network, the network node comprising:
radio network interface circuitry configured to communicate with the UE and to transmit signals via a plurality of transmission reception points (TRPs); and
processing circuitry operatively coupled to the radio network interface circuitry, whereby the processing circuitry and the radio network interface circuitry are configured to perform operations corresponding to any of the methods of embodiments B1-B18.

D2. A network node configured for beam management in a wireless network, the network node being further configured to perform operations corresponding to any of the methods of embodiments B1-B18.

D3. A non-transitory, computer-readable medium storing computer-executable instructions that, when executed by processing circuitry of a network node configured for beam management in a wireless network, configure the network node to perform operations corresponding to any of the methods of embodiments B1-B18.

D4. A computer program product comprising computer-executable instructions that, when executed by processing circuitry of a network node configured for beam management in a wireless network, configure the network node to perform operations corresponding to any of the methods of embodiments B1-B18.

The invention claimed is:

1. A method for a user equipment (UE) configured for beam reporting in a wireless network, the method comprising:
receiving, from a network node of the wireless network, a configuration of at least first and second resource sets, wherein:
each resource set comprises a plurality of reference signals, and
the reference signals in each resource set are associated with respective spatial filtering configurations;
performing measurements on the reference signals of the at least first and second resource sets;
sending, to the network node, a beam report including the measurements arranged in at least first and second groups, wherein:
each group includes measurements performed on a first reference signal from the first resource set and on a second reference signal from the second resource set,
the first and second reference signals are received concurrently by the UE,
one of the measurements included in the first group is expressed as an absolute value,
other measurements included in the first group are expressed as differential values relative to the absolute value included in the first group, and
the measurements included in the second group are expressed as differential values relative to the absolute value included in the first group.

2. The method of claim 1, wherein the measurement in the first group expressed as the absolute value is a measurement of the first reference signal in the first resource set.

3. The method of claim 1, wherein the other measurements in the first group expressed as the differential values include one or more measurements of the second reference signal in the second resource set.

4. The method of claim 1, wherein each group includes measurements performed on at most one reference signal from each of the resource sets.

5. The method of claim 1, wherein for each group, the beam report also includes respective reference signal identifiers associated with the first and second reference signals.

6. The method of claim 5, wherein:
the beam report is arranged into a plurality of preconfigured bitfields;
each group of measurements is arranged according to the following:
a first bitfield that includes the measurement of the first reference signal;
a second bitfield that includes the reference signal identifier associated with the first reference signal;
a third bitfield that includes the measurement of the second reference signal; and
a fourth bitfield that includes the reference signal identifier associated with the second reference signal.

7. The method of claim 1, further comprising receiving, from the network node, a configuration for a number of groups of measurements to be included in a beam report, wherein the at least first and second groups are included in the beam report in accordance with the configured number, where the configuration for the number of groups is included in a setting for channel state information, CSI, reporting.

8. The method of claim 1, wherein one or more of the following applies:
each of the reference signals is a channel state information reference signal (CSI-RS) or a synchronization signal/PBCH block (SSB); and
each of the measurements on the reference signals is reference signal received power (RSRP) or signal-to-interference-and-noise ratio (SINR).

9. A non-transitory, computer-readable medium storing computer-executable instructions that, when executed by processing circuitry of a user equipment (UE) configured for beam reporting in a wireless network, configure the UE to perform operations corresponding to the method of claim 1.

10. A method for a network node configured for beam management in a wireless network, the method comprising:
sending, to a user equipment (UE), a configuration of at least first and second resource sets, wherein:
each resource set comprises a plurality of reference signals, and
the reference signals in each resource set are associated with respective spatial filtering configurations;
transmitting the reference signals comprising the at least first and second resource sets;
receiving, from the UE, a beam report including measurements arranged in at least first and second groups, wherein:
each group includes measurements performed by the UE on a first reference signal from the first resource set and on a second reference signal from the second resource set,
the first and second reference signals are transmitted concurrently,
one of the measurements included in the first group is expressed as an absolute value,
other measurements included in the first group are expressed as differential values relative to the absolute value included in the first group, and
the measurements included in the second group are expressed as differential values relative to the absolute value included in the first group.

11. The method of claim 10, wherein the measurement in the first group expressed as the absolute value is a measurement of the first reference signal in the first resource set.

12. The method of claim 10, wherein the other measurements in the first group expressed as the differential values include one or more measurements of the second reference signal in the second resource set.

13. The method of claim 10, wherein each group includes measurements performed on at most one reference signal from each of the resource sets.

14. The method of claim 10, wherein for each group, the beam report also includes respective reference signal identifiers associated with the first and second reference signals.

15. The method of claim 14, wherein:
the beam report is arranged into a plurality of preconfigured bitfields; and
each group of measurements is arranged according to the following:
a first bitfield that includes the measurement of the first reference signal;
a second bitfield that includes the reference signal identifier associated with the first reference signal;
a third bitfield that includes the measurement of the second reference signal; and
a fourth bitfield that includes the reference signal identifier associated with the second reference signal.

16. The method of claim 10, further comprising sending to the UE a configuration for a number of groups of measurements to be included in a beam report, wherein:
the configuration for the number of groups is included in a setting for channel state information, CSI, reporting; and
the at least first and second groups are included in the beam report in accordance with the configuration for the number of groups.

17. The method of claim 10, wherein one or more of the following applies:

each of the reference signals is a channel state information reference signal (CSI-RS) or a synchronization signal/PBCH block (SSB); and
each of the measurements on the reference signals is reference signal received power (RSRP) or signal-to-interference-and-noise ratio (SINR).

18. A non-transitory, computer-readable medium storing computer-executable instructions that, when executed by processing circuitry of a network node configured for beam management in a wireless network, configure the network node to perform operations corresponding to the method of claim 10.

19. A user equipment (UE) configured for beam reporting in a wireless network, the UE comprising:
radio transceiver circuitry configured to communicate with a network node and to receive signals from a plurality of transmission reception points, TRPs; and
processing circuitry operatively coupled to the radio transceiver circuitry, whereby the processing circuitry and the radio transceiver circuitry are configured to:
receive, from the network node, a configuration of at least first and second resource sets, wherein:
each resource set comprises a plurality of reference signals, and
the reference signals in each resource set are associated with respective spatial filtering configurations;
perform measurements on the reference signals of the at least first and second resource sets;
send, to the network node, a beam report including the measurements arranged in at least first and second groups, wherein:
each group includes measurements performed on a first reference signal from the first resource set and on a second reference signal from the second resource set,
the first and second reference signals are received concurrently by the UE,
one of the measurements included in the first group is expressed as an absolute value,
other measurements included in the first group are expressed as differential values relative to the absolute value included in the first group, and
the measurements included in the second group are expressed as differential values relative to the absolute value included in the first group.

20. The UE of claim 19, wherein one or more of the following applies:
the measurement in the first group expressed as the absolute value is a measurement of the first reference signal in the first resource set;
the other measurements in the first group expressed as the differential values include one or more measurements of the second reference signal in the second resource set.

21. A network node configured for beam management in a wireless network, the network node comprising:
radio network interface circuitry configured to communicate with a user equipment (UE) and to transmit reference signals via a plurality of transmission reception points (TRPs); and
processing circuitry operatively coupled to the radio network interface circuitry, whereby the processing circuitry and the radio network interface circuitry are configured to:
send, to the UE, a configuration of at least first and second resource sets, wherein:

each resource set comprises a plurality of reference signals, and the reference signals in each resource set are associated with respective spatial filtering configurations;

transmit the reference signals comprising the at least first and second resource sets;

receive, from the UE, a beam report including measurements arranged in at least first and second groups, wherein:

each group includes measurements performed by the UE on a first reference signal from the first resource set and on a second reference signal from the second resource set, the first and second reference signals are transmitted concurrently, one of the measurements included in the first group is expressed as an absolute value, and other measurements included in the first group are expressed as differential values relative to the absolute value included in the first group, and the measurements included in the second group are expressed as differential values relative to the absolute value included in the first group.

22. The network node of claim 21, wherein one or more of the following applies:

the measurement in the first group expressed as the absolute value is a measurement of the first reference signal in the first resource set;

the other measurements in the first group expressed as the differential values include one or more measurements of the second reference signal in the second resource set.

* * * * *